United States Patent [19]

Bredberg et al.

[11] Patent Number: 5,442,573
[45] Date of Patent: Aug. 15, 1995

[54] LASER THICKNESS GAUGE

[75] Inventors: Robert E. Bredberg, Markham; Cristian Torres, Downsview, both of Canada

[73] Assignee: Taymer Industries Inc., Markham, Canada

[21] Appl. No.: 53,512

[22] Filed: Apr. 28, 1993

[30] Foreign Application Priority Data

Apr. 28, 1992 [CA] Canada .............................. 2067400

[51] Int. Cl.$^6$ .............................................. G01B 11/06
[52] U.S. Cl. ........................................ 364/563; 356/2; 356/381
[58] Field of Search .................... 364/563, 560; 356/4, 356/375, 381, 382, 1, 2; 340/619, 618; 250/560, 561

[56] References Cited

U.S. PATENT DOCUMENTS

| | | | |
|---|---|---|---|
| 3,180,205 | 4/1965 | Heppe et al. | 356/1 |
| 3,187,185 | 6/1965 | Milnes | 356/1 |
| 4,068,955 | 1/1978 | Bodlaj | 356/381 |
| 4,188,124 | 2/1980 | Jaerisch et al. | 356/371 X |
| 4,192,612 | 3/1980 | Bodlaj | 356/381 |
| 4,209,252 | 6/1980 | Arditty et al. | 356/4 |
| 4,271,477 | 6/1981 | Williams | 356/381 X |
| 4,710,808 | 12/1987 | Hoogenboom et al | 356/381 X |
| 4,961,155 | 10/1990 | Ozeki et al. | 356/375 X |
| 4,979,815 | 12/1990 | Tsikos | 356/1 |
| 5,083,867 | 1/1992 | Burk | 356/384 X |
| 5,162,873 | 11/1992 | Burk | 356/384 X |
| 5,351,126 | 9/1994 | Takada et al. | 356/376 |

Primary Examiner—Edward R. Cosimano
Attorney, Agent, or Firm—Bereskin & Parr

[57] ABSTRACT

An apparatus for determining the position of a surface of a specimen relative to a reference point. The apparatus has a beam source which produces a narrow beam and a beam splitter splits the narrow beam into a primary beam and the secondary beam. The primary and secondary beams are directed by the beam splitter or by a reflector onto the surface of the specimen. The impact points of the primary and secondary beams on the surface of the specimen form images which are monitored by a photo-sensor array. A processor uses the images of the impact points to calculate the distance between the surface of the specimen and the reference point. The use of two such apparatus allows for the thickness of the specimen to be measured.

17 Claims, 16 Drawing Sheets

LASER THICKNESS GAUGE

FIELD OF THE INVENTION

This invention relates to an apparatus for the non-contact measurement of the position, thickness, and surface characteristics of a specimen.

BACKGROUND OF THE INVENTION

In many industries, particularly the steel, plastics, rubber and lumber industries, material is produced by high speed extrusion, rolling, drawing, casting, sawing or other similar techniques wherein the output is carried along a conveyor-type system. Such techniques preclude the use of any measuring system requiring contact with the object, and, in the case of materials such as hot rolled steel, the temperature and heat of the material is too great for a contact-based measurement system. In order to maintain the required high output rate, non-contact techniques have been proposed to calculate the dimensions of the material.

U.S. Pat. No. 3,187,185 to Milnes discloses an apparatus for determining the surface contour and thickness of an article by non-contact means. The apparatus consists of one or more light beam sources and a camera which is preferably connected to a receiver. In using this apparatus, the beam source rotates such that the beam of light travels from one side of the specimen being measured to the other. The camera records the image of the line that the beam makes as it travels across the specimen, and the distance between this line and a reference line is proportional to the thickness of the specimen.

U.S. Pat. No. 4,271,477 to Williams discloses a method and apparatus for the measurement of the width and thickness of relatively thick metal workpieces. This apparatus uses two cameras, displaced vertically and longitudinally from each other, above the workpiece to measure the apparent width of the slab. The thickness of the slab may then be calculated, knowing the apparent width of the images from the two cameras and the vertical distance of the images from the surface upon which the workpiece is supported.

Also known are devices for contact-free thickness measurement of an object in which a beam is periodically deflected onto the object and the time at which the beam strikes each of a plurality of detectors is monitored. From the differential in time at which the beam strikes the various detectors, the thickness of the object may be calculated (see U.S. Pat. Nos. 4,068,955 and 4,192,612 to Bodlaj).

In U.S. Pat. No. 4,710,808 to Hoogenboom et al., there is disclosed a system for measuring the thickness of an object in which light from two sources, which are located on opposite sides of the object, is reflected from the object and the image thus formed is monitored by a video camera and the thickness of the object is determined from the light pattern of the images.

The prior art described above has several short-comings: the beam generator is constantly moving and thus susceptible to mechanical breakdown; the system measures differential thickness in relation to a calibration standard and thus cannot easily be used to accurately measure the thickness of objects with varying thicknesses; and others.

SUMMARY OF THE INVENTION

The present invention is directed to an apparatus for measuring the position of a specimen relative to a reference point.

In accordance with one aspect of the present invention, there is provided an apparatus for determining the position of a specimen relative to a reference point comprising source means for producing a beam of electromagnetic radiation, splitting means for splitting this beam into a primary beam and a secondary beam, reflecting means for directing the primary and secondary beam onto a surface of the specimen such that each of the primary and secondary beams impinge the surface at an angle and converge at the reference point, means for sensing the points at which the primary and secondary beams impinge the surface and for producing a signal related thereto and means for processing this signal to determine the position of the surface of the specimen relative to the reference point.

In another embodiment of the present invention, two of the systems described above are used to measure the thickness of the specimen, one system being located above and one system being located below the specimen. This embodiment has several advantages, namely that any changes in the vertical position of the specimen due to movement of the specimen by, for example, bouncing, are cancelled out when determining the position of the specimen relative to the reference point of each such system.

BRIEF DESCRIPTION OF THE DRAWINGS

A description of the preferred embodiments of the invention will be provided in greater detail below with reference to the drawings, in which.

DESCRIPTION OF THE PREFERRED EMBODIMENTS

Figure 1:
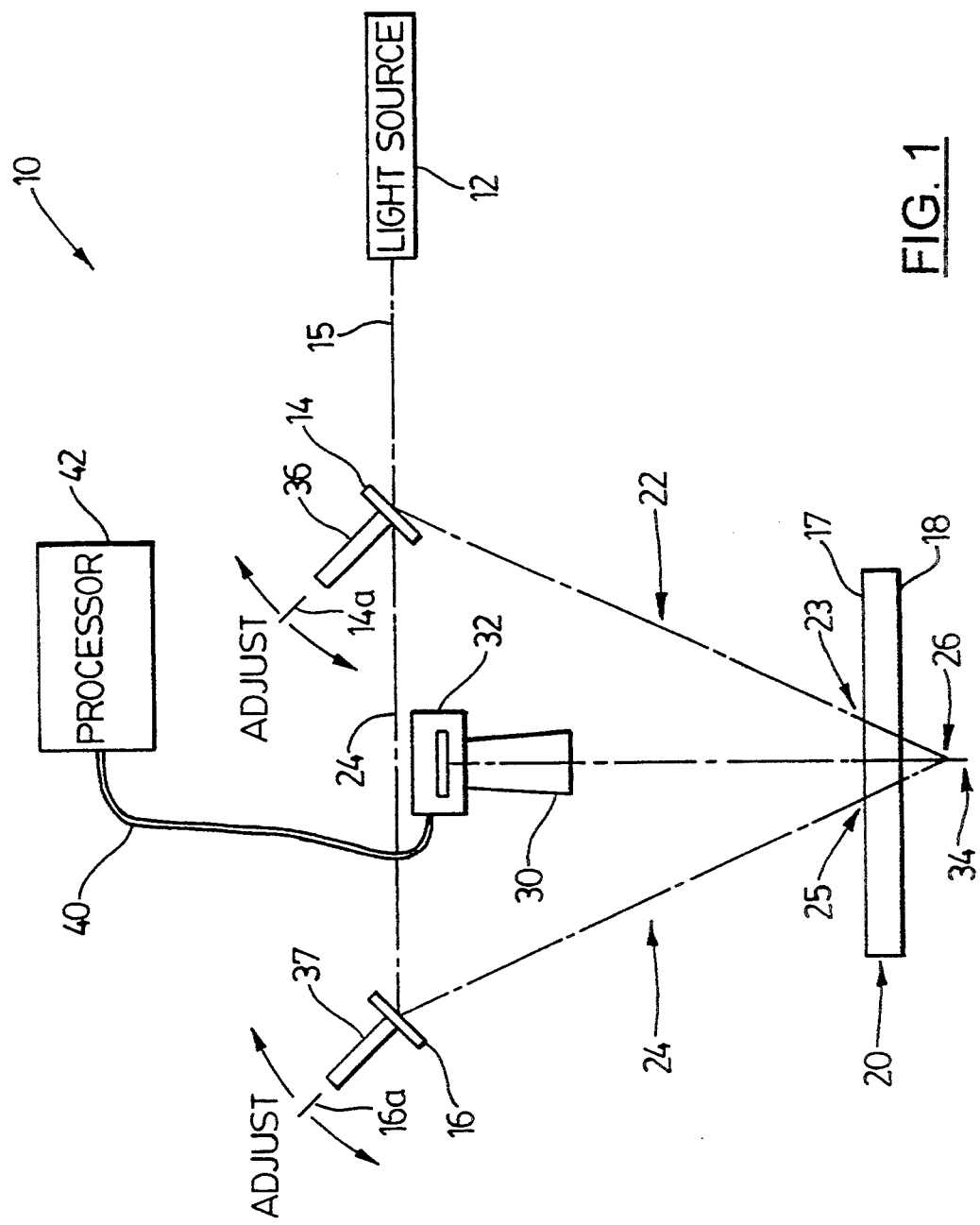
FIG. 1 is a schematic view of one embodiment of the present invention.
Figure 2:
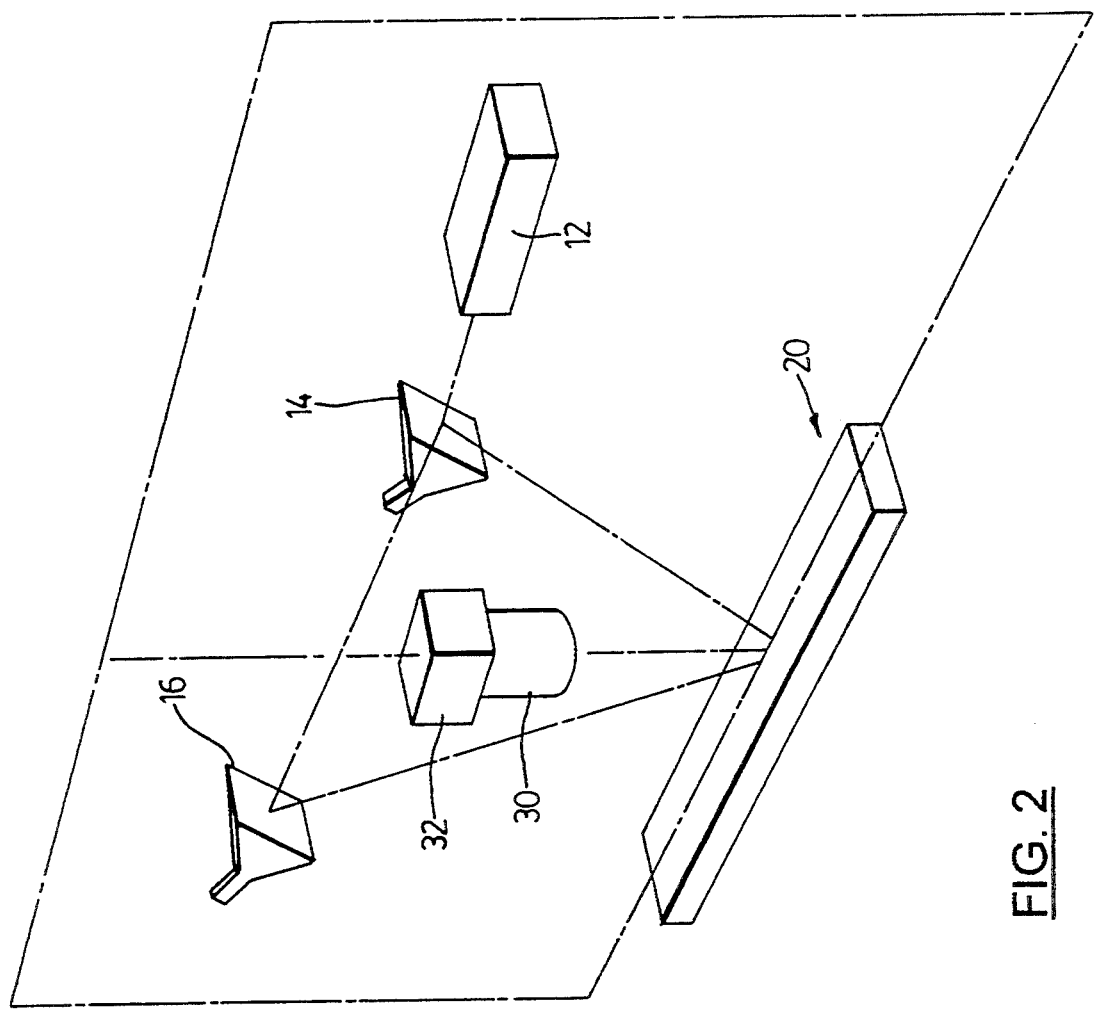
FIG. 2 is a perspective view of the embodiment of FIG. 1.

Referring now to the Figures, where like numerals represent like elements amongst the several views, a device 10 used for measuring the position of a specimen 20 relative to a reference point 26 is shown in FIG. 1. In this representation, the specimen 20 is of rectangular cross-section and the longitudinal dimension of the specimen 20 projects out of the plane of FIG. 1. In FIG. 2, the device 10 is shown in a perspective view. The device 10 is shown located above the specimen 20. However, the device 10 could equally be located in other positions relative to the specimen 20. The specimen 20 has a first surface 17 and a second surface 18 which are opposite and substantially parallel.

The device 10 comprises a light source 12, a beam splitter 14, a reflector 16, a lens system 30 and a photosensor array 32. The light source 12 produces a beam of light 15, which is preferably narrow. Here, the light source 12 is a helium neon gas laser, which produces an orange-red beam having a wave length of 635 nanometers (nm). It will be appreciated that in certain applications, particulary those involving red hot steel, a laser which produces a beam of a different colour, such as green, would be preferable.

The beam of light 15 contacts the beam splitter 14 and is split into a primary beam 22 and a secondary beam 24. The beam splitter 14 directs the primary beam 22 at a predetermined angle onto the first surface 17 of the specimen 20, where it impinges at a spot or impact point designated by reference 23. The beam splitter 14 can be of either a cube-type. design, made by cementing two prisms together, or a plate mirror type design, both of which are known in the art. In most applications, a plate type beam splitter will be used, unless the greater precision and accuracy of a cube-type beam splitter is required.

The secondary beam 24 passes through the beam splitter 14 and continues in a straight path until it impacts reflector 16. The reflector 16 deflects the secondary beam 24 onto the surface 17 of the specimen 20, impinging on the surface 17 at a second sport or impact point designated by reference 25. The reflector 16 is preferably a first surface mirror, the use of which reduces any potential distortion, as the beam does not have to pass through the glass of the mirror.

The beam splitter 14 and the reflector 16 are positioned such that the primary beam 22 and the secondary beam 24 impinge the first surface 17 of the specimen 20 at equal angles to the vertical. This positioning results in the primary beam 22 and the secondary beam 24 having a point of coincidence at a reference point 26.

The beam splitter 14 and reflector 16 are pivotally mounted about respective pivot axes 14a, 16a, each being in the plane of the respective reflecting surface and perpendicular to the plane of FIG. 1. For the beam splitter 14, the pivot axis 14a passes through a point where the two beams separate. Electric motors 36 and 37 are provided for adjusting the angular position of the beam splitter 14 and the reflector 16. The motors 36,37 and the photosensor array 32 are connected to a processor or computer indicated by reference 42. In known manner, the processor 42 includes memory and a microprocessor (not shown) which enable it to run a computer program which is shown in flow chart form in FIGS. 14(a) to 14(e). The processor 42 can be any suitable personal computer such as an IBM compatible microcomputer. The processor 42 and the computer program together with the described hardware provide a programmable capability for automatically adjusting the angular position of the beam splitter 14 and reflector 16. The performance and settings of the motors 36, 37 can be judged by the spot position, spot width and edge transition signals taken from photosensor array 32, as is discussed below. In addition, the program embodied in the processor 42 includes the logic for determining the thickness of the specimen 20. The combination of the processor 42 (and computer program) and the hardware comprising the device 10 provides a programmable device which can be adapted to handle the characteristics of various types of specimens as will be explained below. The source code listing for the computer program is included in a Schedule to this specification.

The photosensor array 32 is positioned such that the optical axis 34 of both instruments is perpendicular to the specimen 20 and is aligned with the reference point 26. As shown in FIGS. 1 and 2, the device 10 includes a lens system 30 which focuses the reflected primary and secondary beams 22,24 from the surface 17 of the specimen 20 onto the photosensor array 32. The photosensor array 32 is preferably a high density CCD (charge coupled device) line scan camera, having an array of 2,048 or 4,096 pixels. When so aligned, the image of the spots or impact points 23 and 25 are projected by the lens system 30 onto the array 32 and the distance between the spots or points on the photosensor array 32 comprises a number of pixels P. The photosensor array 32 is thus able to electronically detect the relative position and brightness of the images of the impact points 23 and 25. The lens system 30 is adjustable and is connected to the processor 42 for automatic adjustment. In this regard, the lens system 30 is considered to be properly focused when the images of the impact points 23 and 25 cover the minimum number of pixels of the array 32 for the desired resolution. The resolution of the device can be increased by changing the inclination of the primary and secondary beams such that the spot width of the image of the impact point is larger, and hence covers more pixels. For this purpose, the lens adjustment mechanism is provided with electric motors. Like the adjustment of the splitter 14 and the reflector 16, adjustment is effected automatically in dependence on data received from the photosensor array 32.

It will be appreciated that impact points 23 and 25 will be substantially brighter than the surrounding surface of the specimen 20. By monitoring the relative brightness of the impact points 23 and 25, the relative surface characteristics, in particular the relative roughness, of the specimen 20 can be determined.

The use of optical filters and polarizers for the lens system 30 will enhance the accuracy of the device 10. Such filters and polarizers are particularly useful if the device 10 is being used to monitor the surface characteristics of the specimen 20.

The array 32 generates a signal 35 which is transmitted via a data cable 40 to a processor 42. The signal 35 contains information with regard to the precise distance between the impact points 23 and 25 created by the primary and secondary beams 22 and 24 as they impinge the first surface 17 of the specimen 20. The processor 42

(and computer program) uses the data thus supplied to calculate the distance between the first surface 17 of the specimen 20 and the reference point 26.

It is a feature of the present invention that the device 10 can be used to measure the thickness of the specimen 20 if the second surface 18 of the specimen 20 is in the same horizontal plane as the reference point 26. The thickness is determined according to a trigonometric algorithm which is embodied in the computer program of the processor 42. According to the algorithm, the thickness (T) of the specimen 20 is determined by the following expression:

$$T = C_3 + \frac{C_2}{P - C_1} \quad (1)$$

The expression (1) for determining the thickness T is a hyperbola which according to constants $C_1$, $C_2$, and $C_3$ is not centered to an origin.

Figure 3:
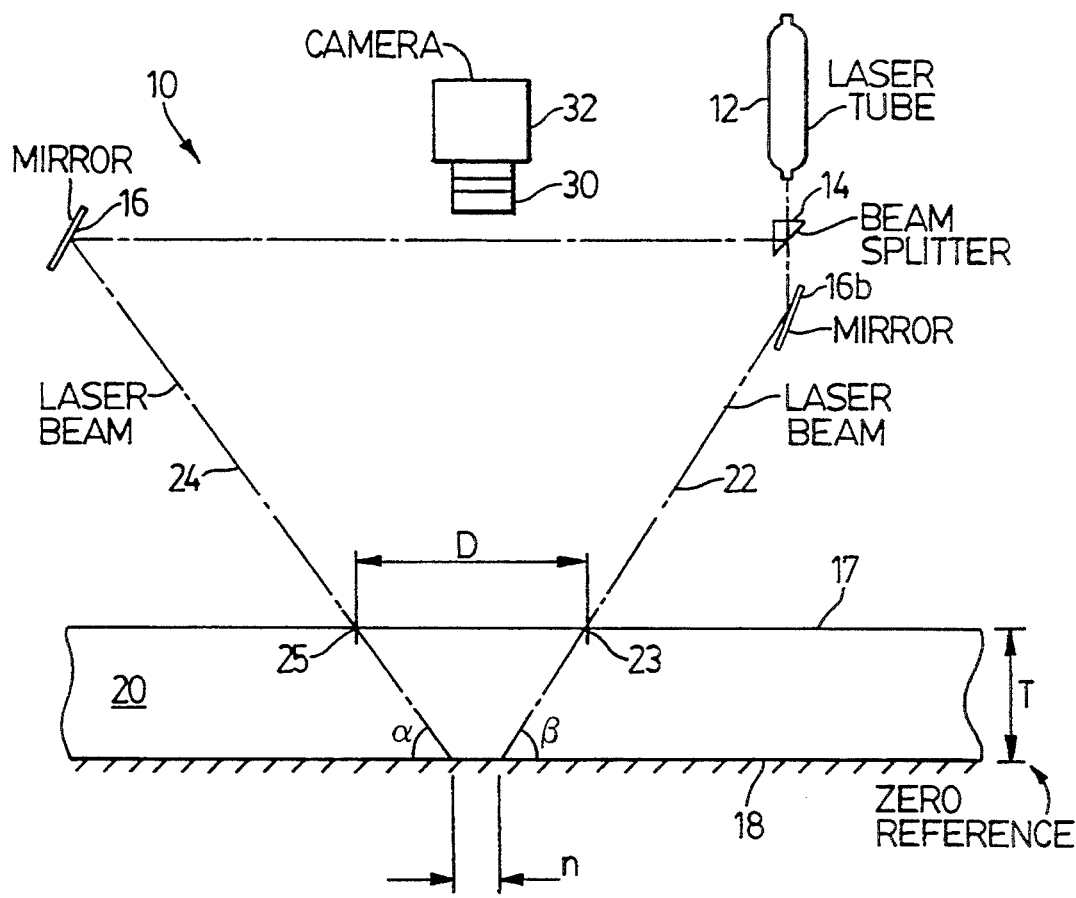
FIG. 3 is a schematic view of the trigonometric relationship established between the beams produced by the thickness gauge and the specimen according to the present invention.

The derivation of expression (1) will now be explained in detail with references to FIGS. 3 to 5. Referring to FIG. 3, the geometrical relationship between the specimen 20 and the primary and secondary beams 22,24 is shown in detail. In FIG. 3, the thickness of the specimen is represented by T and the distance between the impact points 23 and 25 is indicated by D. To determine the thickness T of the specimen 20, the reference point 26 is taken in same plane as the second surface 18 of the specimen 20. In FIG. 3, the angle between the primary beam 22 and the second surface 18 (or zero reference) is designated by $\beta$ and the angle between the secondary beam 24 and the second surface 18 is designated by $\alpha$. Using principles of geometry, the distance D can be expressed as follows:

$$D = \frac{T}{\tan\alpha} + \frac{T}{\tan\beta} + B \quad (2)$$

Expression (2) can be rewritten as expression (3) by factoring T and substituting m and n, as follows:

$$D = mT + n \quad (3)$$

where: $m = \frac{1}{\tan\alpha} + \frac{1}{\tan\beta}$ $n = B$

Figure 4:
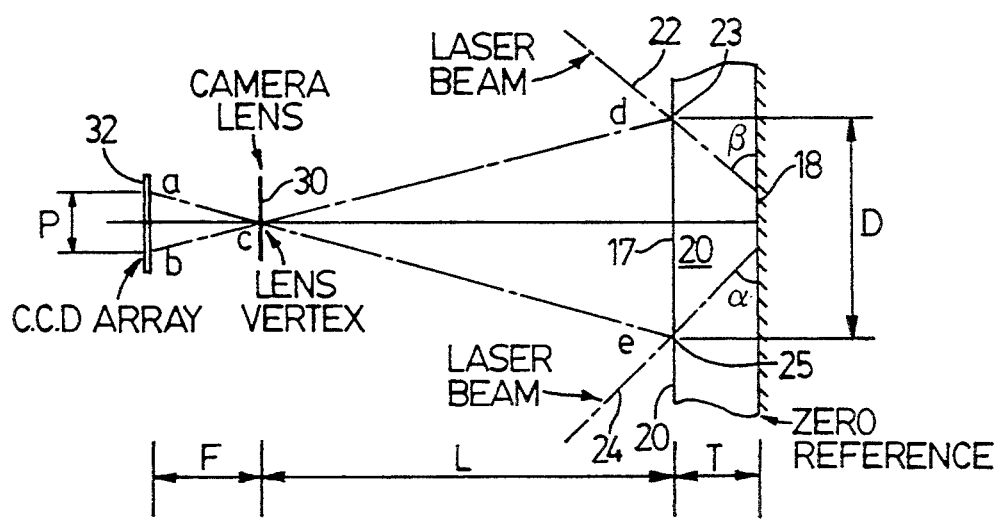
FIG. 4 is a schematic view of the trigonometric relationship between the specimen and the photosensor array of the thickness gauge.

Reference is next made to FIG. 4 in which the relationship between the photosensor array 32 (and lens system 30) and the thickness T is derived.

Referring to FIG. 4, the relationship between the light impinging at points 23 and 25 (i.e. distance D) and the photosensor array 32 can be expressed using similar triangles. The light impinging at points and 25 is focused by the lens system 30 on the photosensor array 32 to form an image comprising a number of pixels (shown as P in FIG. 4). The pixels P are proportional to the distance D. It will be understood by one skilled in the art that the number of pixels P corresponds to the distance between the spots or points 23 and 25 on the photosensor array 32. In FIG. 4, the distance between the first surface 17 (of the specimen and the lens system 30 is indicated by L, and the distance between the lens system 30 and the photosensor array 32 is designated by F. Because triangle abc is similar to triangle cde, the distance D can be expressed as follows:

$$\frac{P}{F} = \frac{D}{L} \quad (4)$$

In the above expression, the distance from the lens 30 to the second surface 18 (i.e. zero reference) can be considered constant, i.e. $C=L+T$ and substituting for L and D in expression (4) yields the following:

$$\frac{P}{F} = \frac{mT + n}{C - T} \quad (5)$$

The above expression (5) relates the number of pixels P to the thickness T of the specimen 20.

Using algebra, the expression (5) can be re-arranged as follows:

$$P = -Fm - Fm \frac{(n/m + C)}{T - C} \quad (6)$$

which can be rewritten as:

$$P = C_1 + \frac{C_2}{T - C_3}$$

where:
$C_1 = -Fm$
$C_2 = -Fm (n/m + C)$
$C_3 = C$ and by isolating the variable for thickness T, the result is expression (1). The expression for determining the thickness T is a hyperbola which is not centred at the origin, and FIG. 5 shows a plot of expression (1) using typical values for the constants $C_1$, $C_2$, and $C_3$ and some reasonable ranges for thickness T and pixels P. As can be seen in FIG. 5, the relationship between the thickness T and the pixels P is non-linear.

The program running on the processor 42 calculates the constants $C_1$, $C_2$ and $C_3$ as part of a calibration procedure. To calculate the values for these constants, three points are measured and the three equations shown below are solved. By letting (t1,p1), (t2,p2) and (t3,p3) represent three known points on the curve shown in FIG. 5, and using algebra, the following three expressions can be derived for calculating the constants:

$$C_1 = p1 - \frac{C_2}{t1 - C_3} \quad (7)$$

$$C_2 = \frac{(p1 - p2)(t1 - C_3)(t2 - C_3)}{(t2 - t1)} \quad (8)$$

$$C_3 = \frac{(p1 - p2)(t3 - t1)t2 - (t2 - t1)(p1 - p3)t3}{(p1 - p2)(t3 - t1) - (t2 - t1)(p1 - p3)} \quad (9)$$

If one of the points taken corresponds to the thickness being equal to zero, then t1 will equal zero.

During the calibration procedure, the program prompts the an operator to remove all specimens 20 from the device 10 and to press a designated key (on a keyboard connected to the processor 42). The program obtains the first point (p1,0), if the thickness is zero. The program then prompts the operator to place a small calibrated gauge which represents the second point (p2,t2). The program repeats these steps for the third point (p3,t3). After calculating the values for the constants $C_1$, $C_2$ and $C_3$, the program can use expression (1) to compute the thickness T for any specimen 20 placed under the device 10.

Figure 9:
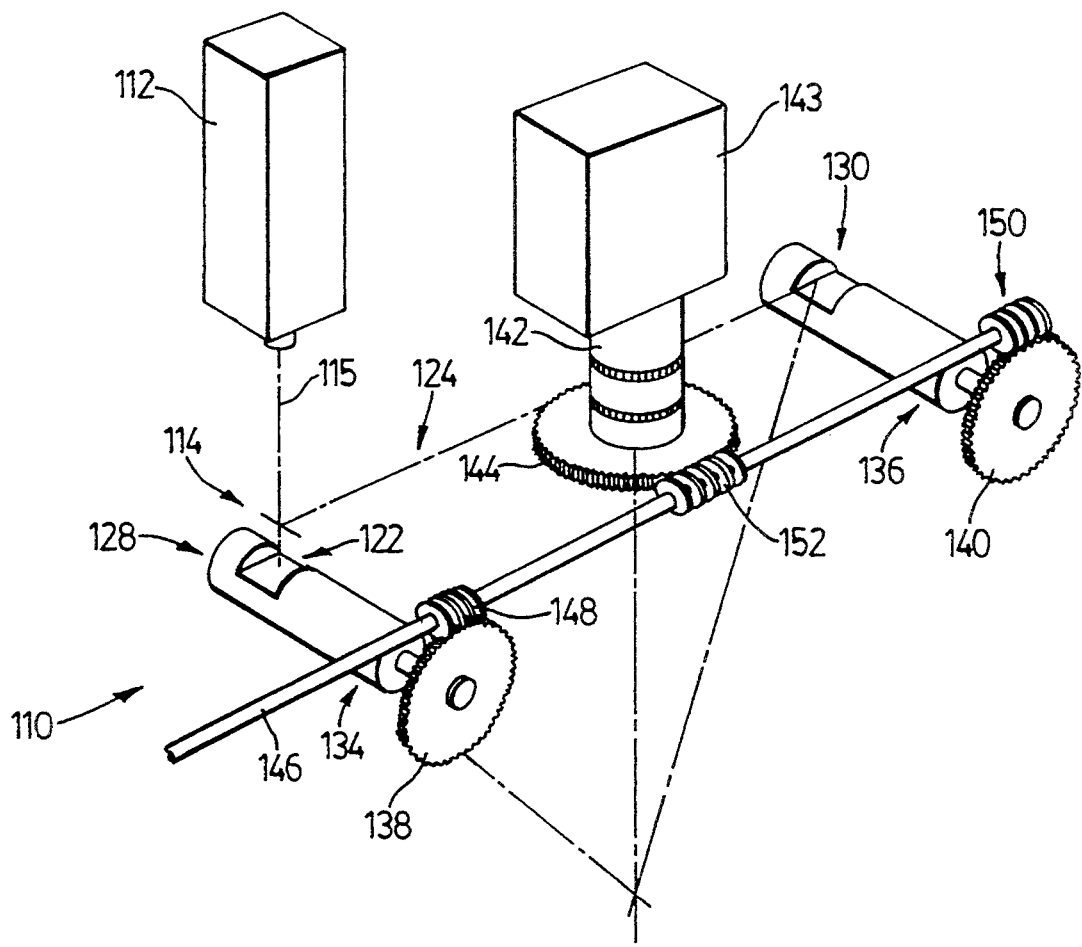
FIG. 9 is a perspective view of another embodiment of the present invention.

Reference is next made to FIG. 9 which shows a second embodiment of the present invention. In the embodiment shown in FIG. 9, the device is indicated generally by reference 110 and includes a light source 112 which produces a beam of light 115. The beam of light 115 is split into a primary beam, 122 and a secondary beam 124 by a beam splitter 114. Unlike in the embodiment discussed above, the primary beam 122 is not deflected by the beam splitter 114 directly onto a surface of the specimen but rather continues in a straight path until it contacts primary beam reflector 128. The beam splitter 114 directs the secondary beam 124 to a secondary beam reflector 130. The primary beam reflector 128 and the secondary beam reflector 130 direct the primary beam 122 and the secondary beam 124, respectively, onto the surface of the specimen to be measured (not shown). It will be appreciated that there could be any number of reflectors between the light source 112 and the beam splitter 114, to facilitate positioning the light source 112 in a convenient location. Also, there could be additional reflectors between the beam splitter 114 and the primary beam reflector 128 or the secondary beam reflector 130, again, to facilitate the layout of the particular application.

Also in FIG. 9, there is shown an automatic lens and reflector adjustment mechanism. In this embodiment, the primary beam reflector 128 and the secondary beam reflector 130 are fitted into posts 134 and 136, respectively, which have attached to them gears 138 and 140, respectively. The focus ring of the lens 142 has attached to it gear 144. Gears 138, 140, 144 are aligned such that a shaft 146 is common to all. Preferably, the shaft 146 is connected to a geared reduction motor (not shown). The shaft 146 contains worm 148 to engage gear 138, worm 150 to engage gear 140 and worm 152 to engage gear 144.

Gear 138 and worm 148 and gear 140 and worm 150 are configured such that primary beam reflector 128 and secondary beam reflector 130 will move equally but in opposite directions when shaft 146 is rotated. For this purpose, worm 148 and worm 150 are of opposite hand. Gear 144 and worm 152 are configured such that lens 142 will be focused on the beam positions. With such configurations, the lens system will remain synchronized with the positions of the beams.

Figure 11:
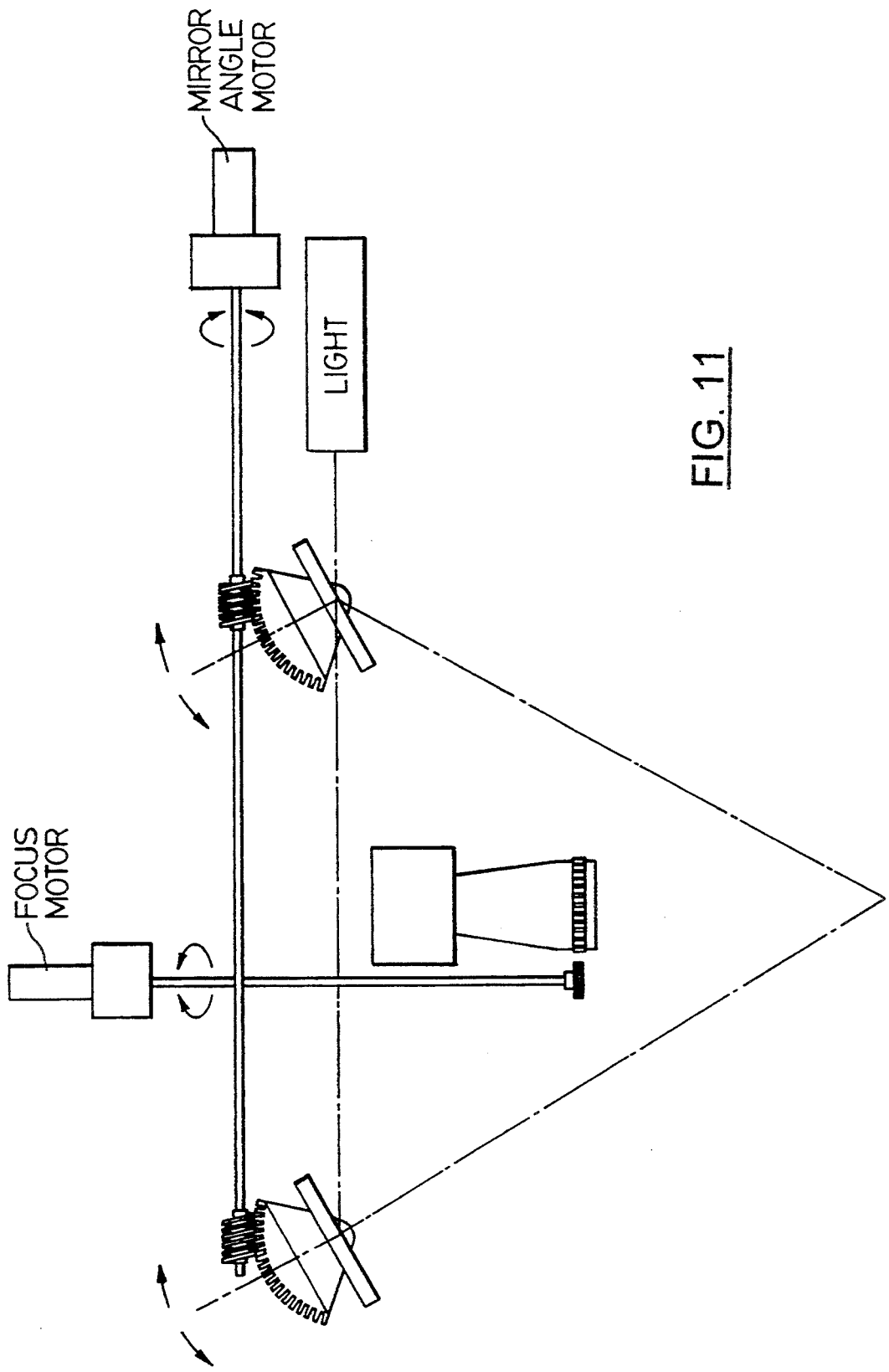
FIG. 11 is a perspective view of an embodiment showing an automatic lens and reflector mechanism.

As is shown in FIG. 11, the adjustment of the reflectors can be independent of the adjustment of the focus of the lens system. This allows the vertical position of the device relative to the specimen to be changed without changing the angles at which the primary and secondary beams impinge the surface of the specimen.

Figure 10:
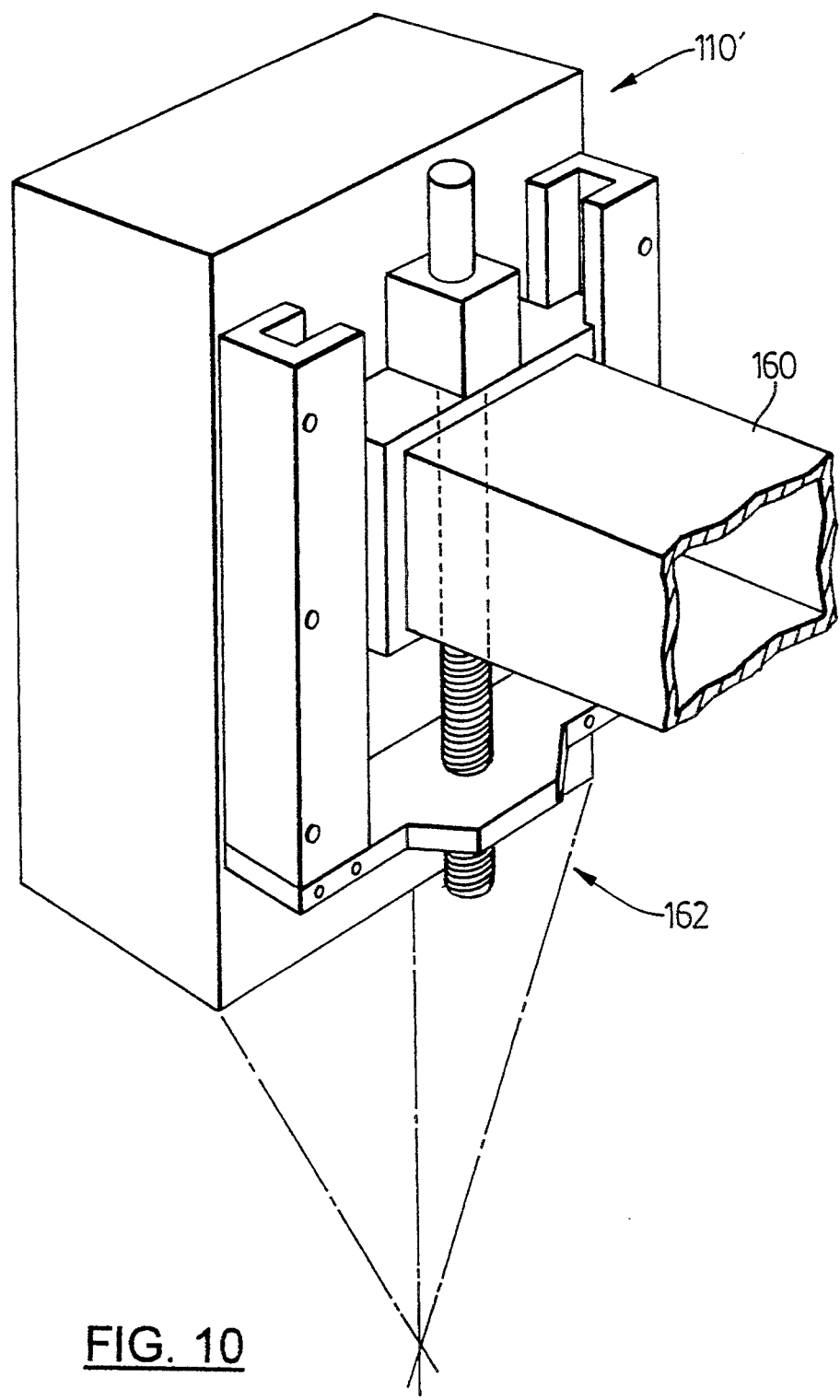
FIG. 10 is a perspective view showing a vertical adjustment mechanism.

It is preferable that the device be mounted on a frame assembly such that the device can be moved vertically perpendicular to the thickness of the specimen to be measured. In FIG. 10, the device is represented by one block denoted by reference 110; in reality, the elements of the device as described above would be mounted to a frame assembly. The device 110 is attached to a support member 160 by a screw assembly 162. A closed loop servo control system, controlled by the processor (not shown), moves the device up or down relative to the support member 160, and allows for accurate positioning of the device 110 relative to the surface of the specimen to be measured.

The position of the reflectors 128 and 130 can be determined by the processor from the spot position, spot width and edge transition signals taken from camera 143. A shift in the position of the images of the impact points on the linear pixel array results from either a change in the angle of the reflectors 128 and 130 or a change in the thickness of the specimen. Thus, it is possible for the processors to determine when the thickness of the specimen changes and adjust both the vertical adjustment mechanism of the lens and reflector focus mechanism accordingly.

While the device described above is suitable for use in situations where the bottom surface of the specimen can be maintained in the same horizontal plane as the point of coincidence and the reference point, in many industrial applications the position of the lower surface of the specimen relative to the reference point is unknown. For example, when produced in a rolling mill, steel has a tendency to bounce up and down on the rollers of the conveyor system. In such a situation, it would not be possible to accurately measure the thickness of a specimen using the device shown in FIG. 1.

Figure 6:
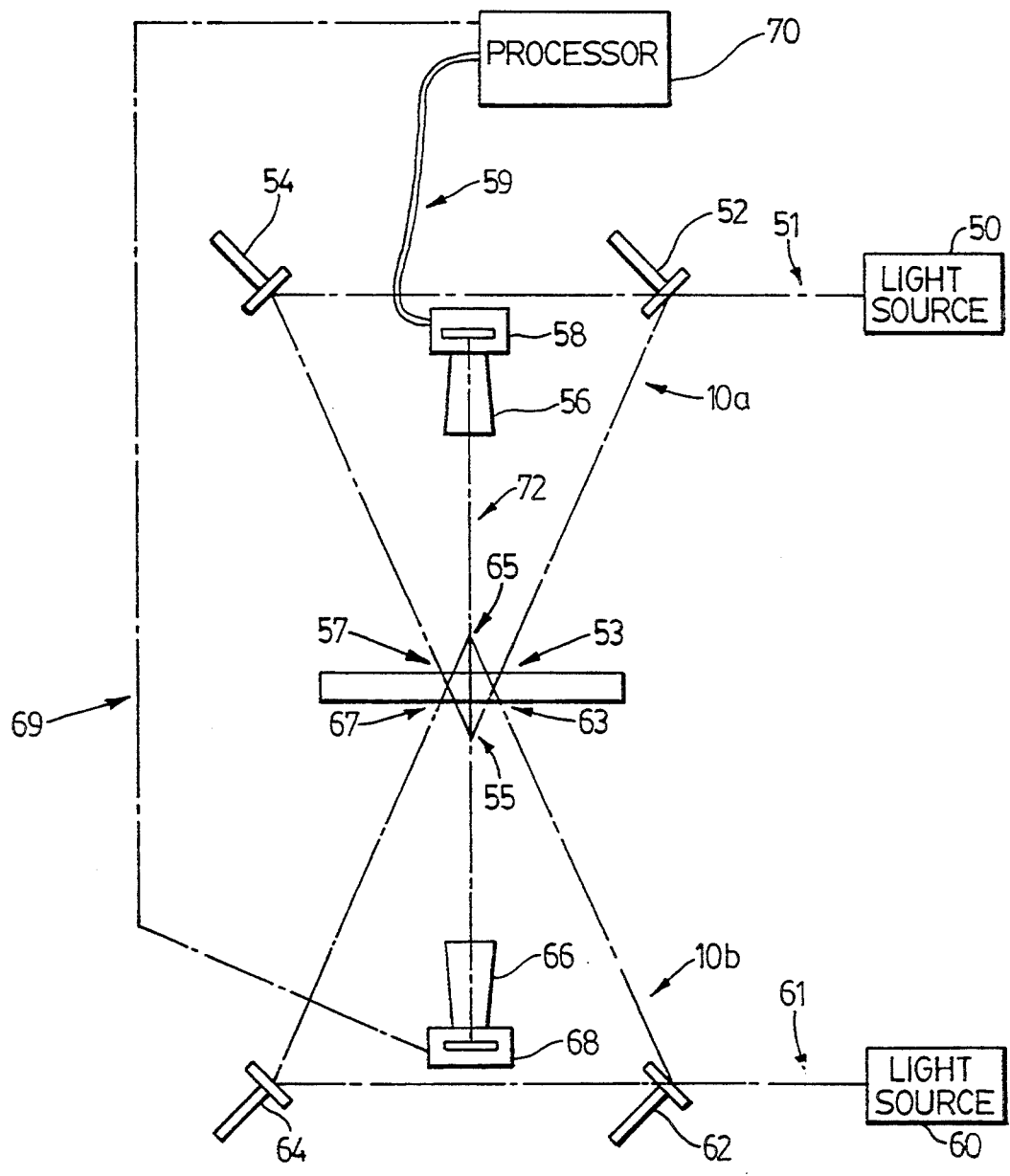
FIG. 6 is a schematic view of a second embodiment of the present invention.

To overcome this limitation, two devices indicated generally by references 10a and 10b, one located above and one located below the specimen, can be used, as shown in FIG. 6. In this two-device system, light sources 50 and 60 produce beams of light 51 and 61 which are split by beam splitters 52 and 62. The beam splitters 52 and 62 split the beams 51 and 61 into primary and secondary beams, as described above. The beam splitters 52 and 62 and the reflectors 54 and 64 are aligned such that the primary and secondary beams converge at reference points 55 and 65 on line 72, which line is also the optical axis of lens systems 56 and 66 and photosensor arrays 58 and 68. The images formed on photosensor array 58 of impact points 53 and 57 are transmitted by data cable 59 to processor 70. Likewise, the images formed on photosensor array 68 of impact points 63 and 67 are transmitted by data cable 69 to processor 70. It will be appreciated that, in the two-device system of FIG. 6, any variations in the vertical position of the specimen 20 relative to reference points 55 and 65 are in effect cancelled by the image received by the opposite sensor. Thus, the use of this system allows the thickness of the specimen 20 to be calculated accurately, even if the specimen 20 moves vertically relative to the points of coincidence 55 and 65.

Figure 8A:
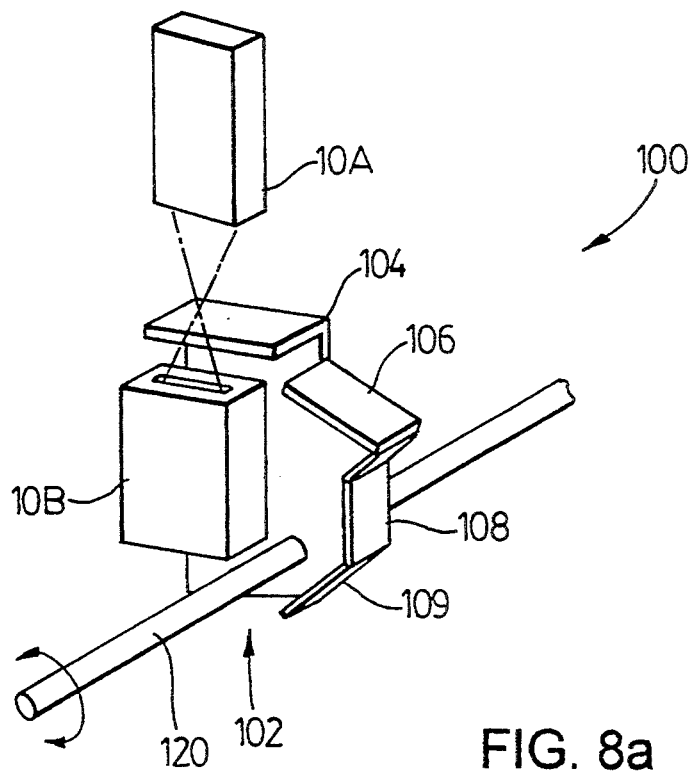
FIGS. 8(a) is a perspective view of the referencing mechanism feature of the present invention.
Figure 8B:
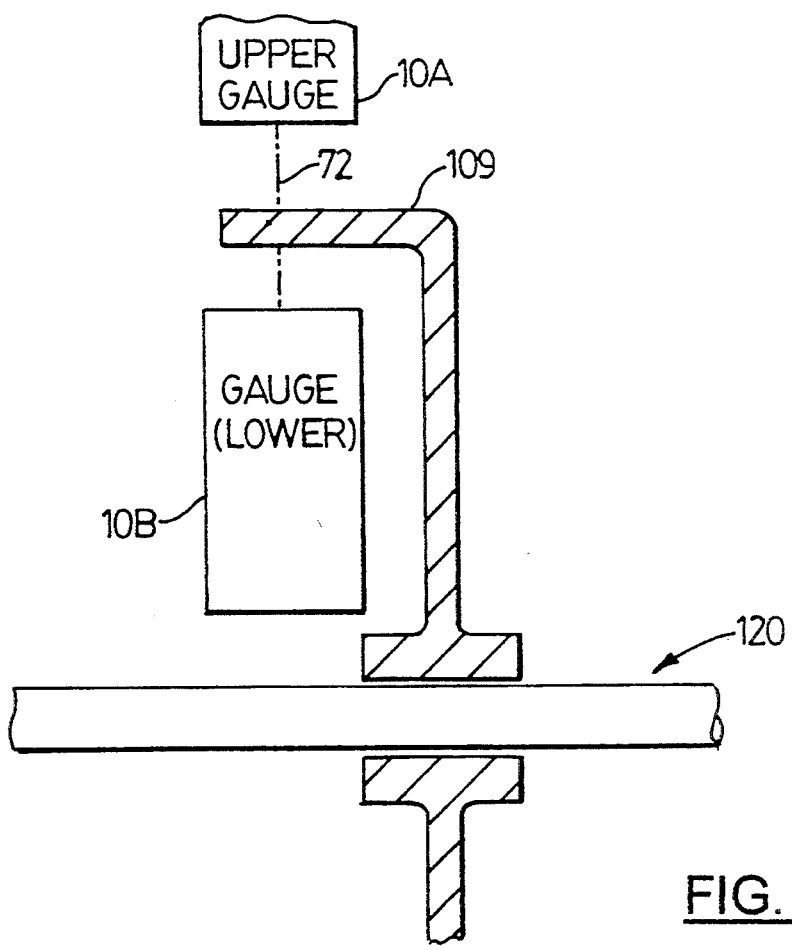
FIG. 8(b) is a partial sectional view showing the referencing mechanism of FIG.8(a) in the referencing position.

The accuracy of the device 10 (or 10a or 10b) is enhanced through the use of a referencing mechanism, which is shown in FIGS. 8(a) and 8(b). This mechanism, shown generally at 100, consists of a metal wheel 102, into the periphery of which are machined, to high tolerances, a plurality of reference elements. In FIG. 8(a), four reference elements 104, 106, 108, 109 are shown each having upper and lower reference surfaces. The wheel 102 is mounted on a motor-driven shaft 120 (motor not shown).

The mechanism 100 is located and used as follows. The shaft 120 is placed such that the wheel 102 is proximate to line 72 of FIG. 6. When properly aligned, the wheel 102 can be rotated such that one of the reference elements e.g. 109 projects across line 72, as shown in FIG. 8(b). In this position, the devices 10a, 10b measure the thickness of the reference element, e.g. 109. Based on this measurement, the processor 70 can verify the continued accuracy of its readings or make any mechanical or computational adjustments required. If such an adjustment is required, the processor 70 is able to use the images of the impact points of the reference element as a guide.

The reference elements can also be used to calibrate each gauge or device. Each device essentially measure the number of pixels P in the image, for any given surface that is a distance T from a reference point. The variable T is therefore the "thickness" between that surface and the reference point. As was explained in detail above, the thickness T can be calculated from the number of pixels P in the image according to expression (1), which is repeated below:

$$T = C_3 + \frac{C_2}{P - C_1} \qquad (1)$$

where $C_1$, $C_2$ and $C_3$ are constants.

Figure 5:
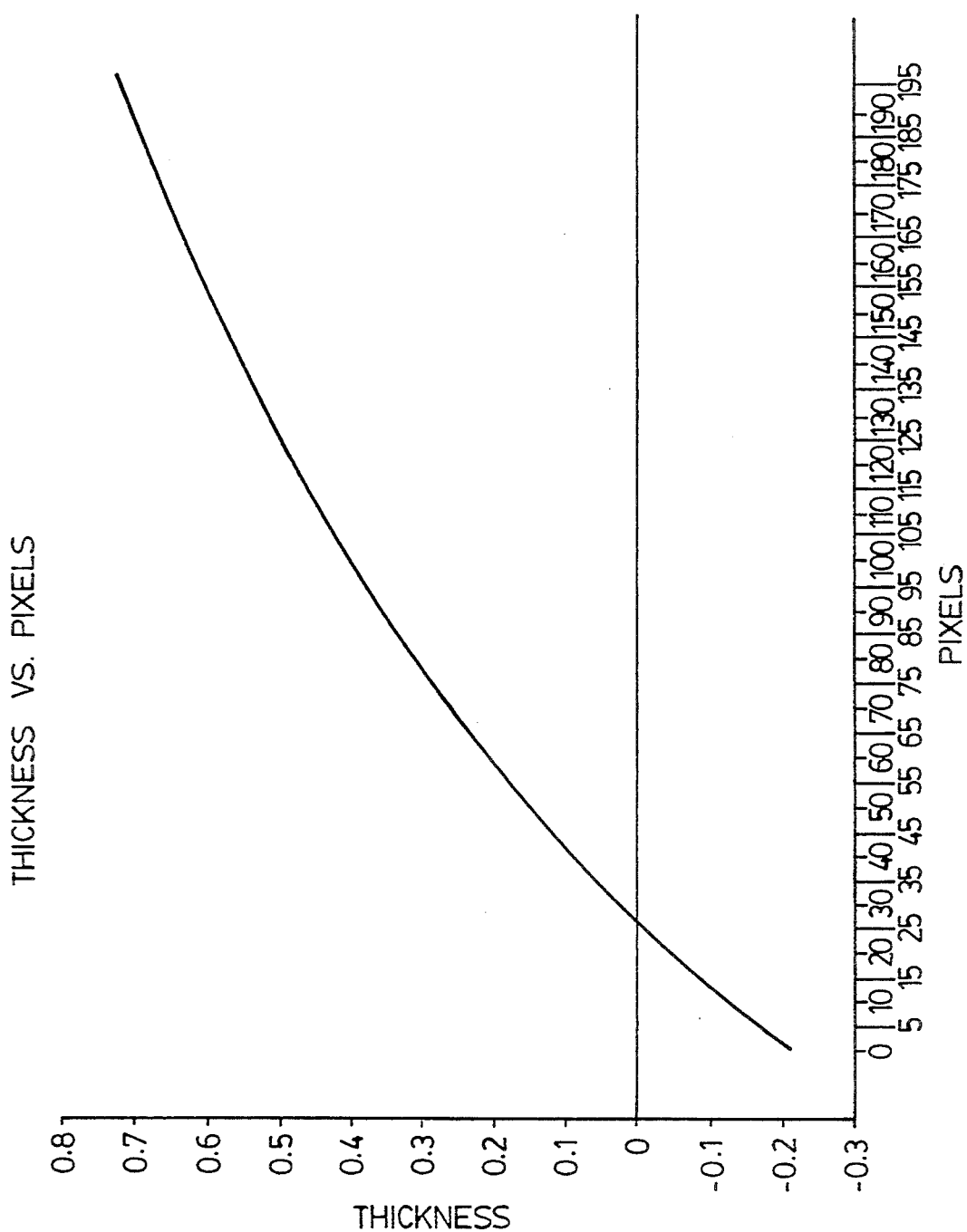
FIG. 5 is graph showing the relationship between the thickness of the specimen and the number of pixels P corresponding to the distance between two spots on the photosensor array.

A plot of this relationship is a hyperbola as is shown in FIG. 5. It will be realised that the reference point is arbitrary and any alteration in it simply results in altering the value of $C_3$. As there are three constants, three measurements are necessary to determine their value, for each device (see above). As noted the absolute value of $C_3$, on the reference point, is arbitrary. However, for the two device system, the two values of $C_3$ should be chosen to given the correct thickness of one reference element.

To verify the accuracy of any such adjustments and calibration, another reference element is rotated into position and the readings from this element are compared with the readings of the previous surface. If the readings are not within the desired tolerances, further adjustments can be made. In addition, the device 10 could signal a fault if the desired tolerance is not achieved.

Once the referencing process is complete, the wheel 102 rotates into a "park" position, where none of the reference elements are in the plane of the device 10, and a specimen 20 can therefore be measured. It is preferable that the device 10 be able to perform the referencing procedure discussed above easily and quickly, by, for example, having a control switch that initiates the referencing procedure. It will be appreciated that the reference mechanism 100, and in particular the shaft 120, must be fixed to a member of sufficient structural integrity that, when in position, the reference elements do not move relative to the device 10.

If there is in place a means to determine whether a specimen is present or absent at a particular device (possibly by signals received from further up the production line), the referencing mechanism is able to rotate into and out of the production path during the between product" intervals. For instance, if the specimen to be measured is manufactured in sheets., the referencing process can be performed between every sheet, or every set number of sheets, to reduce the possibility of a long term dimensional drift going undetected.

Figure 7:
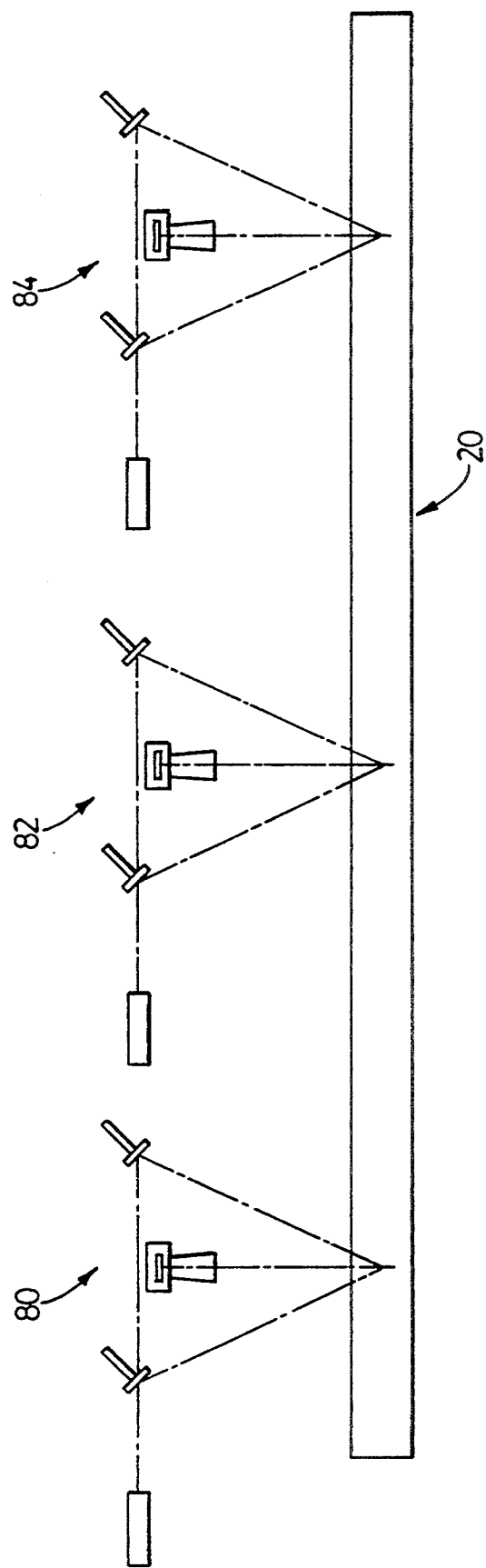
FIG. 7 is a plan view of a third embodiment of the present invention.

In a third embodiment of the present invention, illustrated in FIG. 7, a plurality of sensor devices are used to determine the flatness of the specimen. In FIG. 7, three devices 80, 82 and 84, each of which is essentially as shown in FIG. 1 and described above, are used to determine the warpage of the specimen 20. The devices 80, 82 and 84 are aligned such that the point of coincidence for each device lies on the same horizontal plane. By determining the position of the surface of the specimen 20 relative to this plane, using the method described above, the warpage of the specimen 20 can be calculated. The devices 80, 82 and 84 can be displaced from one another along the width of the specimen as well as being displaced longitudinally along the specimen. If the devices are not displaced, the specimen 20 can be measured for not only warpage in the longitudinal direction, but also along its width.

The computer program (shown in Schedule) also includes a function for automatically adjusting the angles of the reflector(s) 16 and beam splitter (14) through the motors 26,37. The automatic adjustment routine involves using the photosensor array 32 to track the impact point 23 or 25 as its position shifts in response to a change in the angle of the reflector 16 (or beam splitter).

Figure 12:
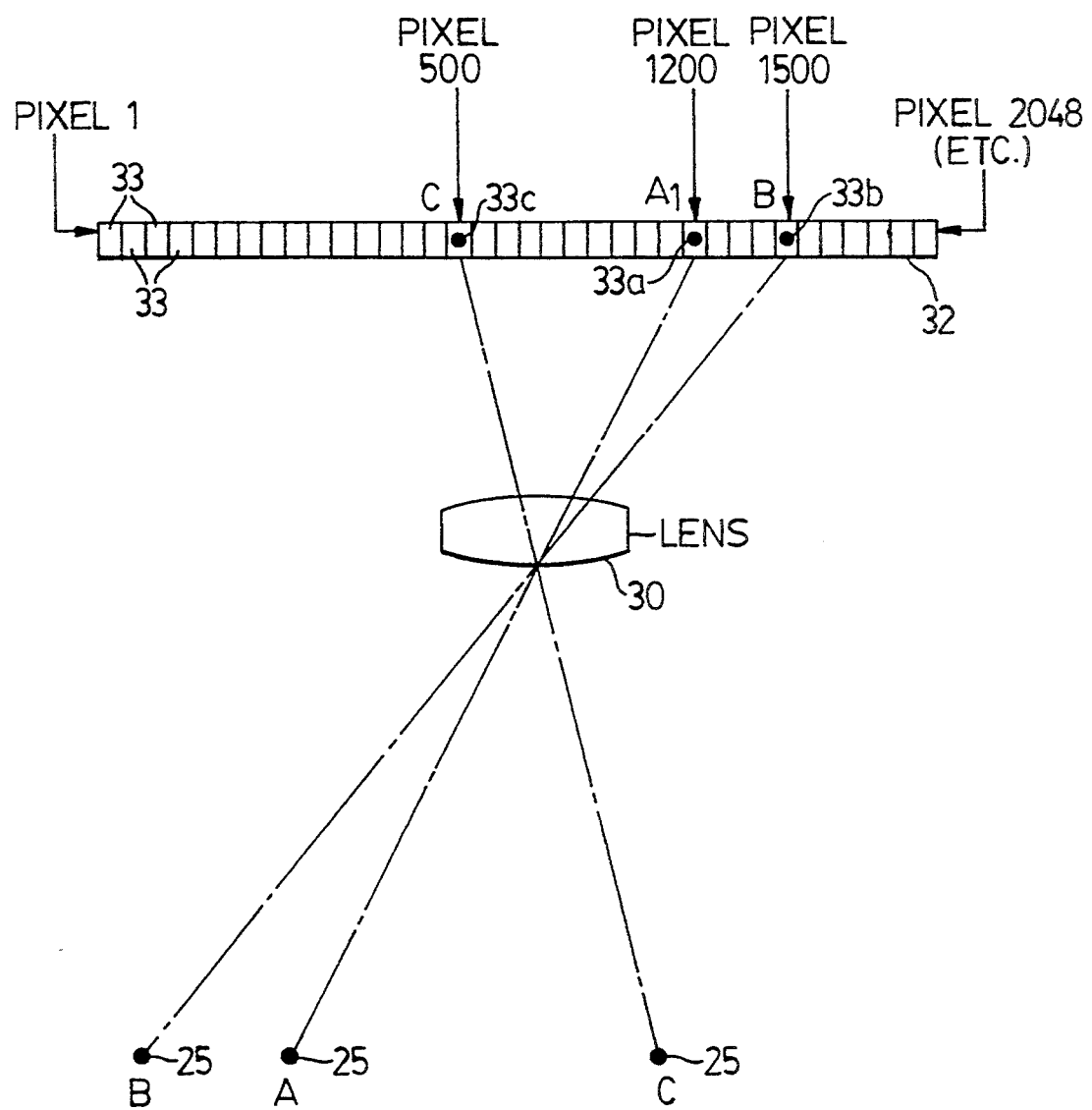
FIG. 12 is a schematic view of the automatic adjustment feature of the device according to the present invention.

Reference is made to FIG. 12 which shows the automatic adjustment feature. The photosensor array 32 comprises a linear CCD array which essentially comprises a row of photosensitive elements (or pixels) indicated by reference 33. The photosensor array 32 (and program) processes the electronic signals generated by the photosensitive elements 33 in sequential order, e.g. the first pixel signal (data) first, then the second pixel signal (data) next, etc., until all the pixel signals have been processed. The program uses the sequential processing of the photosensitive elements 33 to determine the position of the impact point 25 (or 23) relative to the linear array, and also relative to the beginning and the end of the linear CCD array.

As shown in FIG. 12, when the impact point 25 moves from point A to point B, the photosensitive elements 33a at pixels 1200 to 1500 will be charged for example. Similarly, if the impact point 25 moves from point A back to point C in response to a change in the angle of the reflector 16, then photosensitive element 33a at pixel 500 will be charged. Using this routine, the processor 42 is able to follow the position change of the impact point 25 (or 23) as it moves in response to a change in the angle of the reflector 16 by activating the motor 37.

In addition, the automatic adjustment routine can be expanded to include a photosensor array 32 self-diagnostic procedure, which would involve illuminating the photosensitive elements 33 and testing their response.

Figure 13:
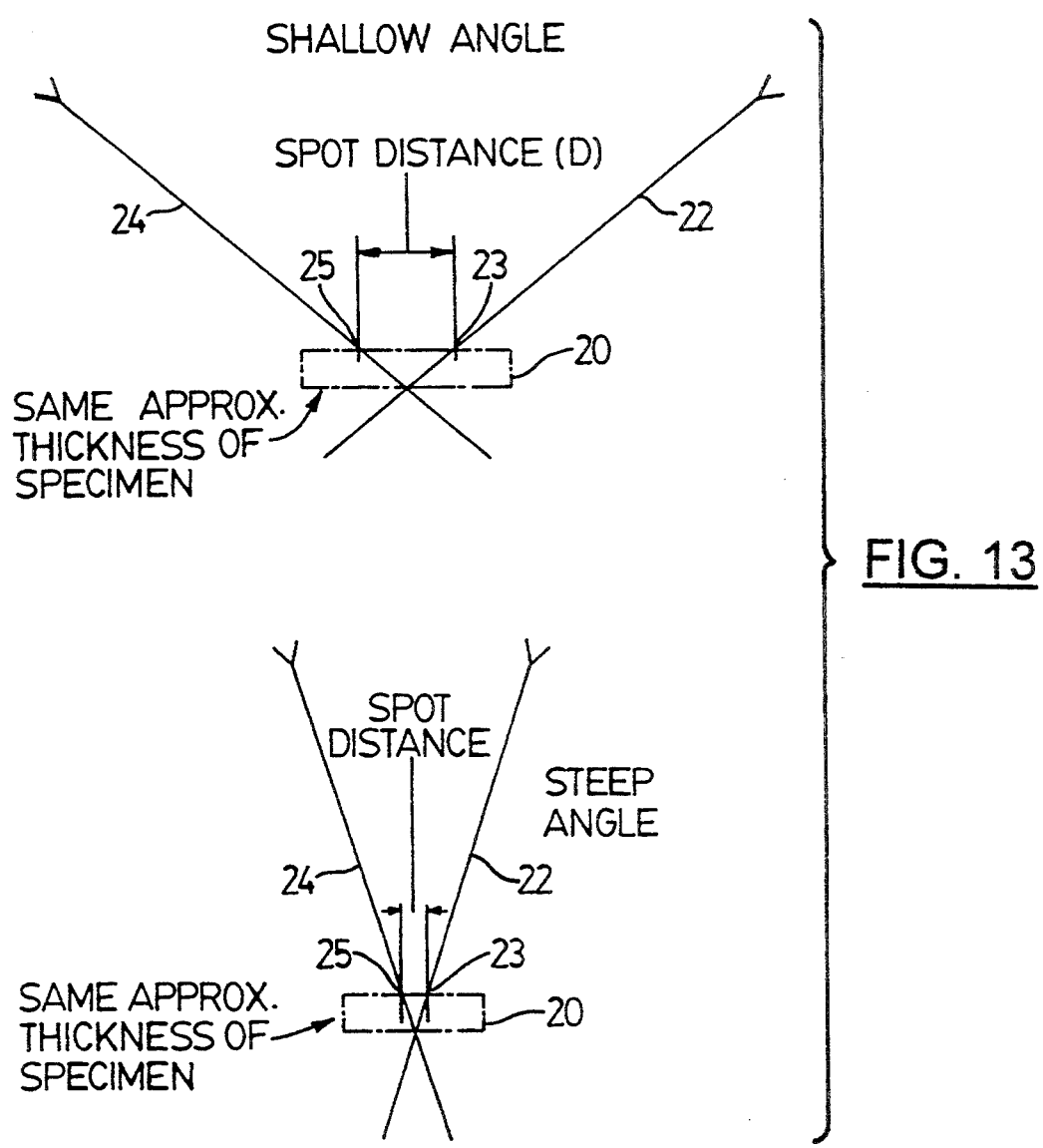
FIG. 13 is a schematic view of another aspect of the automatic adjustment feature shown in FIG. 12.

Reference is lastly made to FIG. 13 which shows the increased resolution available for measuring specimens 20 having a thin thickness T. The resolution or precision of the device 10 can be increased by moving the reflector(s) 16 and beam splitter(s) 14 to produce beams 22,24 with shallow angles as shown. The shallow angles of the beams 22,24 produces a greater distance D between the impact points 23,25, which results in more photosensitive elements 33 (or pixels) being utilized by the processor and program. Conversely by moving the reflector(s) 16 and beam splitter(s) 14 to produce beams 22,24 with steeper angles increases the range, i.e. thickness T which can be measured by the device 10, but decreases the resolution because the distance D between the impact points 23,25 and therefore number of active pixels decreases.

It will be appreciated that in any of the preferred embodiments described above, the device must be attached to a support of sufficient structural integrity to isolate the device from vibration in order to achieve the desired accuracy and tolerances.

Reference is next made to FIGS. 14(a) to 14(e) which show in flow chart form the method steps embodied in the computer program executed by the processor 42 (or 70).

Figure 14A:
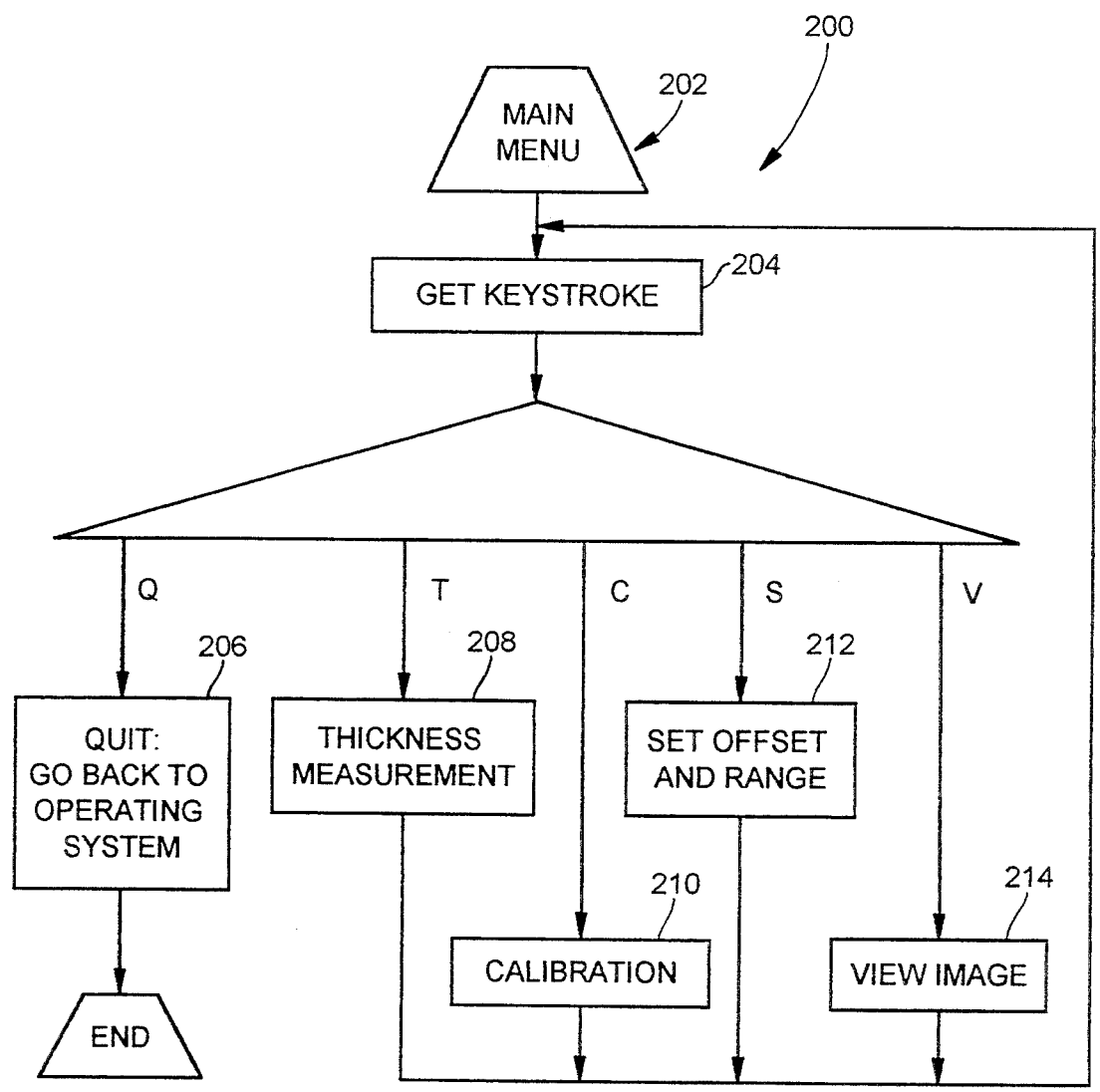
FIGS. 14(a) to 14(e) are flow charts depicting the method steps according to the present invention as embodied in a computer program.

Reference is first made to FIG. 14(a) which shows an embodiment of a computer program or routine indicated generally by reference 200 for accessing various functions provided by the device. The program 200 can be accessed from a main menu 202 which runs on the operating system of the processor. As shown in FIG. 14(a), the program 200 waits for a keystroke to be entered by the user (via a keyboard) as indicated by block 204. When a keystroke is entered, the program 200 processes the keystroke as follows: If key "Q" is entered, then in block 206 program 200 "quits" and returns control to the operating system, e.g. main menu 202. If key "T" is entered, then the program 200 enters or executes a "Thickness Measurement" routine indicated by block 208. The Thickness Measurement routine 208 is shown in more detail in FIG. 14(e). If key "C" is pressed by the user, then the program 200 executes a "Calibration" routine indicated by block 210. The Calibration routine 210 is shown in more detail in FIG. 14(d). If the user presses key "S", the program 200 enter a "Set Offset and Range" routine 212. The Set Offset and Range routine 212 is shown in more detail in FIG. 14(b). Lastly, if the user presses key "V", the program 200 executes a "View Image" routine 214. The View Image routine 214 is shown in more detail in FIG. 14(c).

Figure 14B:
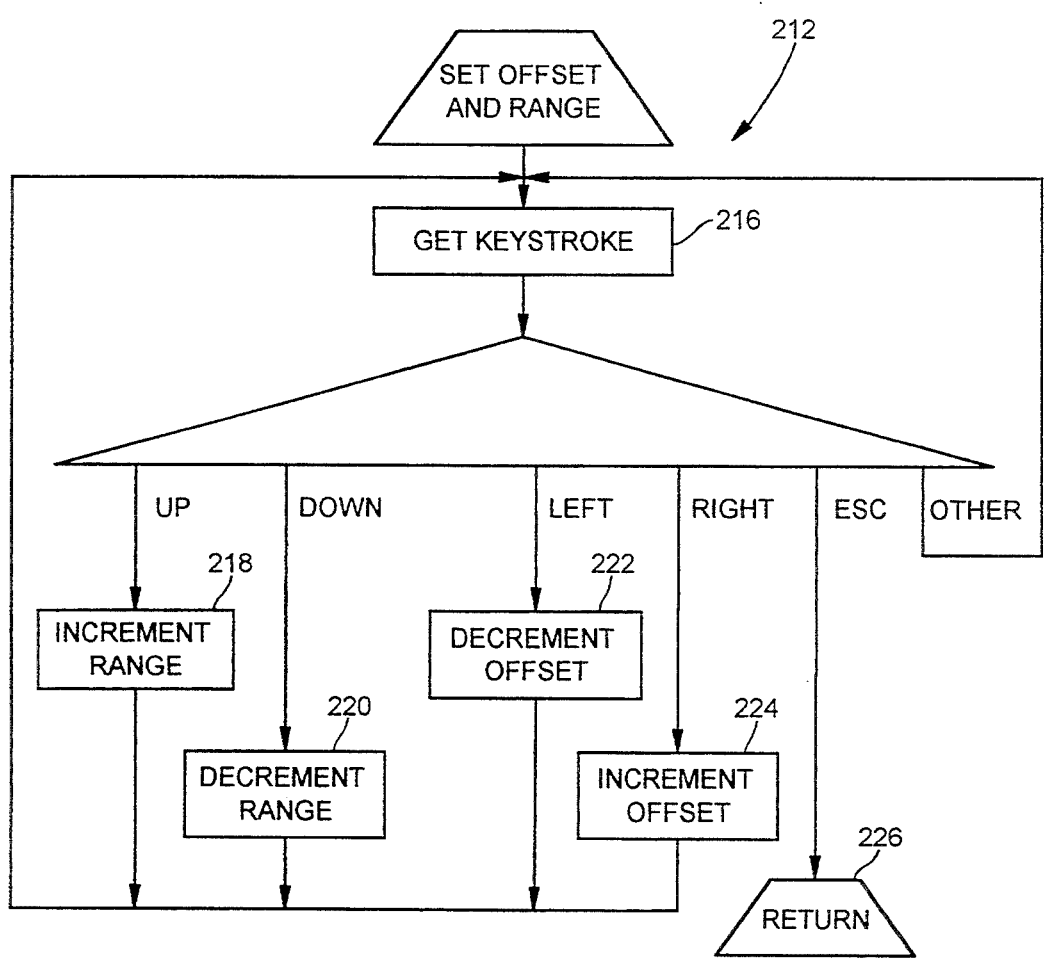

Reference is next made to FIG. 14(b) which shows the Set Offset and Range routine 212 in more detail. The Set Offset routine 212 waits for a keystroke from the user as indicated in block 216. If the 37 UP" arrow key is pressed, the routine 212 increments the range parameter (block 218). Conversely, if the "DOWN" key is pressed, the routine 212 decrements the range parameter (block 220). If the "LEFT" arrow key is pressed, the routine 212 decrements the offset setting (block 222). Conversely, if the "RIGHT" arrow key is pressed, the routine 212 increments the offset setting (block 224). If the "ESC" key is pressed, the routine 212 is exited (block 226). If the user hits any other key, the routine 212 ignores the entry and waits for another keystroke.

Figure 14C:
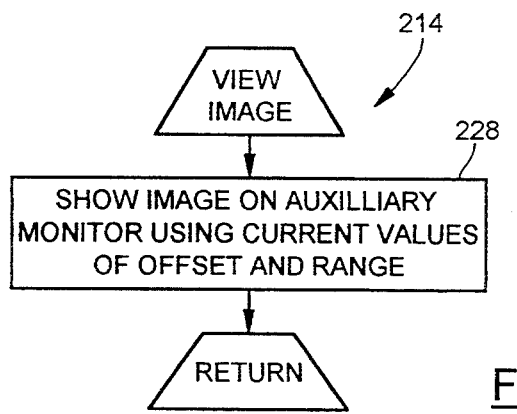

Reference is next made to FIG. 14(c) which shows the View Image routine 214. The program 200 uses the View Image routine 214 to show or display the image produced by the beams impinging on the surface of the specimen 20 (see FIG. 1). The program 200 displays the image on an auxiliary monitor according to the current values for the Offset and Variable parameters (block 228). The auxiliary monitor (not shown) is coupled to the processor.

Figure 14D:
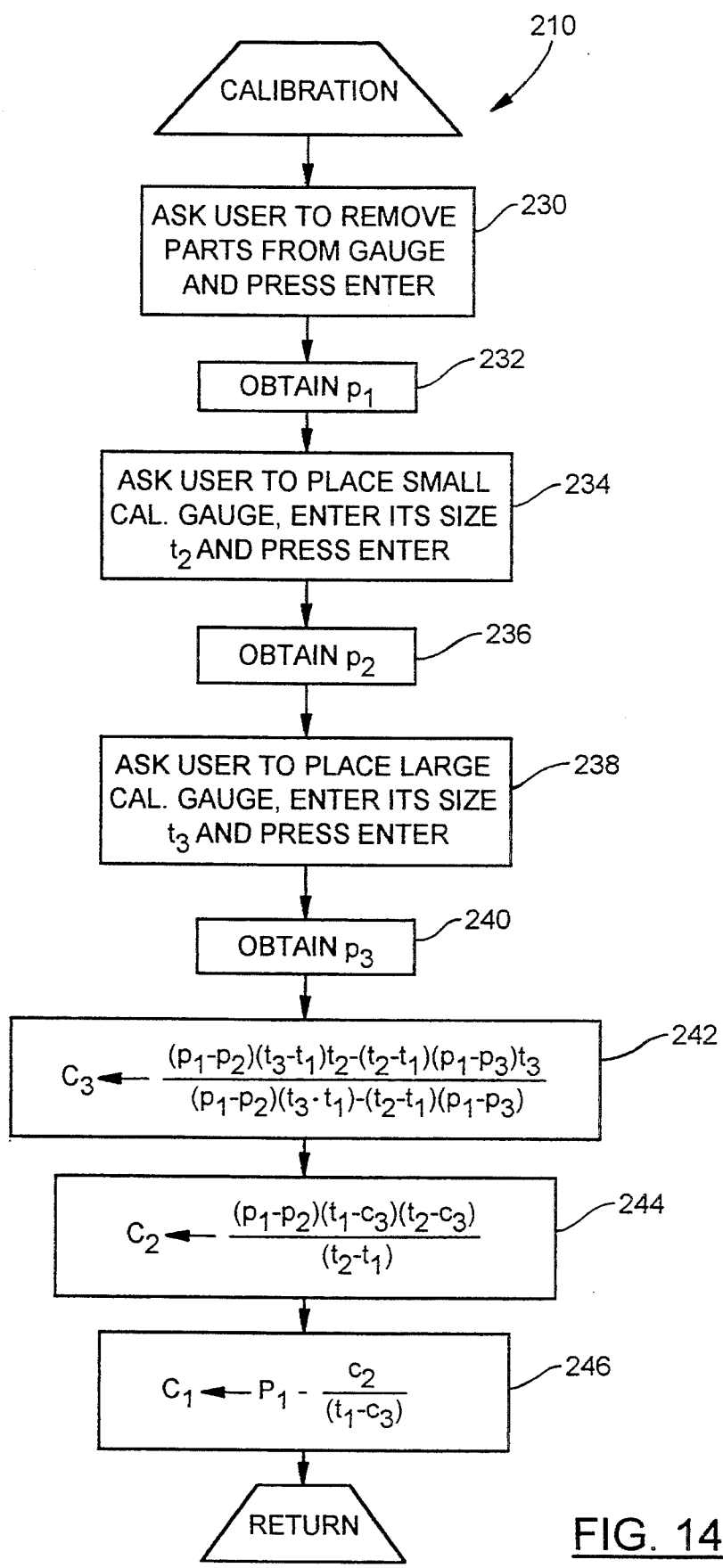

Reference is next made to FIG. 14(d) which shows the Calibration routine 210 in more detail. The Calibration routine 210 is used to calibrate the device 10 (FIG. 1) as was described above. The Calibration routine 210 first prompts the user to remove the specimen 20 from device 10 (FIG. 1) and press the "ENTER" key (block 230). The routine 210 then obtains a first point (p1,0) as indicated in block 232. The Calibration routine 210 next in block 234 prompts the user to place a small calibrated gauge and enter its size, i.e. t2 and then press the "ENTER" key. The routine 210 then determines a second point (p2,t2) in block 236. The routine repeats these steps using a larger calibration gauge with known size t3 in blocks 238 and 240 to obtain a third point (p3,t3). In block 242, the Calibration routine 210 uses expression (9) above to determine the value for constant "$C_3$". Similarly, in block 244, the routine 210 uses expression (8) to determine the value for constant "$C_2$". In block 246, the routine 210 determines the value for constant "$C_1$" using expression (7). As described above, the values of the constants $C_1, C_2, C_3$ are used in expression (1) to compute the thickness T for any specimen 20 placed under the device 10.

Figure 14E:
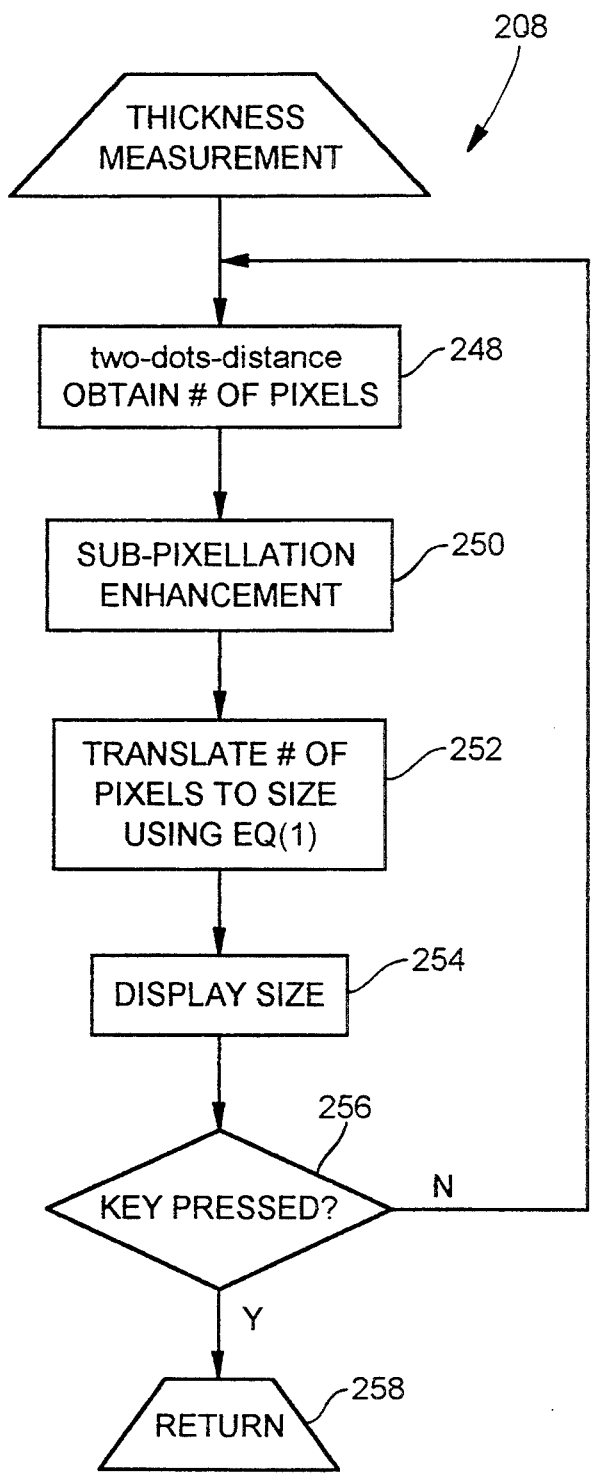

Reference is next made to FIG. 14(e) which shows the Thickness Measurement routine 208 in more detail. The Thickness Measurement routine 208 computes the thickness T of a specimen 20 using expression (1) which was described above. In block 248, the routine 208 determines the distance, i.e. number of pixels, between the two impact points in the image (see FIG. 12). The routine 208 includes a processing step in block 250 for enhancing pixel data. In block 252, the routine 208 computes the thickness T using the pixel number determined in blocks 248,250 and expression (1). The thickness T is displayed by the routine 208 in block 254. The routine 208 can continue calculating the thickness T until a key is pressed as indicated in block 256. Once a key is pressed, the routine 208 returns control to the program 200 as indicated in block 258.

It will be appreciated that the program 200 and routines can be implemented using a Graphical User Interface (GUI) in addition to the keystroke "handler" approach. The source code listing for the program 200 is attached as a Schedule. The program 200 is written in the "C" programming language which is within the understanding of those skilled in the art.

While the present invention has been described with reference to certain preferred embodiments, various modifications will be apparent to those skilled in the art of any such modifications are intended to be within the scope of the invention as set forth in the appended claims.

Schedule - Source Code Listing for Computer Program

```
#include <stdio.h>
#include <stdlib.h>
#include <sii.h>          /* Required by all SII applications */
#include <is.h>            /* Required for wait function       */
#include <math.h>          /* Required for wait function       */
#include "chrono.h"        /* Required to get processing timer */
#include "getarg.h"        /* Define the getarg function       */
#include "menu.h"
#include <string.h>
#include <graph.h>
#include "video.h"
#include <bios.h>
#include <time.h>          /* For date & time */

/* Prototypes for static functions */
/* These functions cannot be used easily outside of cntrfeat.c */
/* beacause of the dependencies to static cntrmask, colormask, and symbol NBCOLOR */
```

```c
static void loadcolor( LUT *lut);
static void loadmono( LUT *lut);
static void waitkey( unsigned *option);
void    offset_range( IW *,int *,int *);
float   getfloat(char *, int, int,int);
float   two_dots_distance(void);
float adjustment(float x);
extern void init_tick(void);
extern unsigned tick(void);
extern void free_tick(void);
void leave(void);
void  Calibrate(void);
float GetNumericEntry(int row, int col, int space, int attr);
void ClearPromptLine(void);

struct RECORD
{
   int  reference_darkness;
   unsigned int  thrs;
   int  offsets ;
   int  ranges ;
   float C1;
   float C2;
   float C3;
} data = {100,90,125,100,100.00,100.00,100.00};

#define MAXDOT      4096       /* Size of DOTOP vector used to store the chain code */
#define NBCOLOR     16         /* Number of colors for pseudo coloring */
#define ACQMODE     55     /* ACQMODE oculus parameter register number  */
#define TRUE        1
#define FALSE       0
#define rrr         50
#define factor      .1

/* Option flags for do_cntr() */
#define DISPCNTR    0x0001     /* Display cntrs over the image */
#define DISPFEAT    0x0002     /* Display features to stdout */
define SINGLESTEP  0x0004     /* Single step between each object */ define ESC         27     /* ascii value for ESCAPE  */
define MAXSTR 60
#define TIMEOUT ((int)(15 * 18.2))

static int cntrmask = 0;        /* bits used by the cntr_* implementation (device depend
ent) */
static int colormask = 0;       /* bits used for coloring */
char Txtbuf[MAXSTR] ;     /* General purpose text buffer */
char *str;
unsigned uKey;            /* Unsigned key code                     */
int darkness;
int x1,yy1,x2,y2,x3,x4,a,b ;
int first_point = 1;
float dots_distance;
double points_len= 0;
double temp= 0;
int time0, time1, time2, time3, time4, time5;
int old_acqmode;            /* save current value of 'acqmode' */
int calibration ;
int image_beg = 20;
int centre_line = 392; /*374*/
PIX8 buf;

void readstatus(void)
{
    FILE *ftable;
    long recseek;
    int newrec;
    if( (ftable = fopen( "data.dat", "r")) != NULL )
    {
        /* Read data from file .*/
        newrec = 1;
        recseek = (long)((newrec - 1) * sizeof(data));
        fseek( ftable, recseek, SEEK_SET );

fread( &data, sizeof(data), 1, ftable );
    }
    else
    {
        /* File did not exist. Create it for writing. */
```

```c
        if( (ftable = fopen( "data.dat", "w" )) == NULL )
            return;
        /* Write table to file. */
        fwrite( &data,sizeof(data),1,ftable);
    }
    fclose( ftable );
}

/*.... Write parameters to a file in hard disk........................*/
void writestatus(void)
{
    FILE *ftable;
    if( (ftable = fopen( "data.dat", "w" )) == NULL )
            return;
    fwrite( &data,sizeof(data),1,ftable);
    fclose( ftable );

}

/******************************************************************/

Description:

Wait until user press a key, disable SINGLESTEP option if user
press ESC key.

/******************************************************************/
static void waitkey( unsigned *option)
    {
    int opcode, dx, dy;
    while( (opcode = defmouse( &dx, &dy)) == IA_NOP);
    if( opcode == IA_QUIT) *option &= ~SINGLESTEP;
    }

/* Enter and adjust the offset and range of the image
 * Input   : Window, Offset and Range
 * Output  : New offset andd range
 ******************************************************************/
void offset_range( IW *iw,int *offset,int *range)
    {
    LUT *lut;                           /* Pointer to the input LUT */
    int doffset = 0;                    /* define offset value */
    int drange = 0;                     /* define range value */
    int stop = 0;                       /* flag to stop processing functions from user
*/ lut = lut_alloc( iw, LUT_IN);       /* Allocate a LUT handle for Input LUT */ if( lut == NULL) return;            /* Check if handle allocated */
    Box(7,40,2,30);
    _settextposition( 8, 42 );
    sprintf(Txtbuf," Offset & Range ");
    _outtext( Txtbuf );
    iw_grab( iw, -1);                   /* Starts continuous grab */
    while( !stop)                       /* Process commands until user escapes from pro
gram */
        {
        setadcoffset( iw, *offset);     /* set offset */
        setadcrange ( iw, *range);      /* set range  */
/* lut_slop(lut,0,0,(100),0); */
        _settextposition( 9, 42 );
        printf("Offset: %3d", *offset );
        printf("       Range : %3d\r", *range);   /* Display Current threshold */
        cursor(25,0);                   /* Move cursor out of screen*/ switch( defmouse( &doffset, &drange)) /* Process defmouse opcode */
            {
            case IA_TOP:                /* Set threshold to maximum value */
            case IA_RIGHTSIDE:
                *offset = 0;
                *range  = 225;
                break;

case IA_BOTTOM:             /* Set threshold to minimum value */
            case IA_LEFTSIDE:
```

```
                    *offset = 0;
                    *range = 225;
                    break;

case IA_CENTER:                /* Set threshold to middle value */
                    *offset = 126;
                    *range = 126;
                    break;
                default:                       /* Default is to update threshold according to
    mouse movement */
                    *offset += doffset;        /* Update threshold */
                    if( *offset > 255)         /* Validate new threshold */
                        *offset = 255;         /* Maximum value */
                    else if( *offset < 0)
                        *offset = 0;           /* Minimum value */
                    *range += drange;
                    if( *range > 255)          /* Validate new threshold */
                        *range = 255;          /* Maximum value */
                    else if( *range < 0)
                        *range = 0;            /* Minimum value */
                    break;

case IA_QUIT:
                    stop = 1;
                    break;
            }
        } lut_norm( lut );
        lut_sel( lut );
        lut_free( lut );
        iw_grab( iw, 0 );
    }

/*......Main menu ................................................*/
void MainMenu( void )
{
    ITEM mnup[5];
    int iMainCur = 0;
    ITEM mnuMain[] =
    {                           /* Highlight Char Pos */
        { 0, "Quit                    "},  /* Q      0    */
        { 0, "THICKNESS MEASUREMENT   "},  /* D      0    0 */
        { 0, "CALIBRATION             "},  /* S      0    */
        { 0, "SET OFFSET & RANGE      "},  /* S      0    */
        { 0, "View image              "},  /* S      0    */
        { 0, ""                         }
    };
    enum CHOICES
    {
        QUIT, DISTANCE,CALEBRATION, OFFSET,VIEW,CHANGE
    };
    int fColor, fFirstTime = TRUE;
    int iMode;
    int i,j,k;
    FILE *ftable;
    while( TRUE )
    {
     setbkcolor( (long) TBLUE );

_clearscreen( _GCLEARSCREEN );
        /* Select from menu. */
    Box(3,23,2,37);
    _settextposition (4, 26);
    sprintf(Txtbuf, "      TAYMER INDUSTRIES");
    _outtext ( Txtbuf );
    _settextposition( 5, 26 );
        sprintf(Txtbuf," THICKNESS MEASUREMENT   ");
    _outtext( Txtbuf );
    iMainCur = Menu( 10, 38, mnuMain, iMainCur );
        /* Branch to menu choice. */ switch( iMainCur )
        {
            case QUIT:
                return ;
            case DISTANCE:
                setadcoffset( stdiv, data.offsets);    /* set offset */
                setadcrange ( stdiv, data.ranges);     /* set range  */
                calibration = FALSE;
                            two_dots_distance();
                /* display_darkness(); */
```

```
                    break;
                case CALIBRATION:
                    setadcoffset( stdiv, data.offsets);    /* set offset */
                    setadcrange ( stdiv, data.ranges);     /* set range  */
                            calibration = TRUE;
                            Calibrate();
                    break;
                case OFFSET:
                    offset_range( stdiv, &data.offsets,&data.ranges);
                    writestatus();
                    break;
                case VIEW:
                    _settextposition( 24, 6 );
                    printf(" Press any key to continue.....");
                    while (! kbhit())
                        {
                        iv_grab( stdiv, 1);
                                iv_wline(stdiv,image_beg,centre_line,DIR_E,512,buf);
                        }
                    iv_grab( stdiv, 0);
                    break;
                case CHANGE:
                    break;
            }
        }
} int main( int argc, char **argv)
{
    int error;                /* Error Code from SII */

/*************** Resource Allocation ************************/
    argv[0] = NULL;           /* Strip off program name */
    /* system("od300 -b340 -l -pl -v0"); */
    sii_init( argc, argv);    /* Initializes SII and binds to driver(s) */
    error = getsiierr();      /* Gets error status */
    if( error)                /* Exits on fatal errors */
        {
        printf("*** FATAL ERROR: %s ***\n", siierrmsg( error));   /* Print error using defa
ult error messages */
        if( error == INODEV)
            {
            printf("An ODX driver is associated with each Coreco device\n");
            printf("You must load at least one ODX driver before calling this program\n");
            }
        exit(1);
        }
    readstatus();
    MainMenu();
    /* system("od300 -k -b340"); */ sii_end();                /* Ends SII */
    _setbkcolor( (long)_TBLACK );
    _settextcolor( _TBRIGHTWHITE );
    clrscr();
    /*  _clearscreen( _GCLEARSCREEN );  */
    exit(0);
} float getfloat(char *prompt, int drow, int dcol,int length)
{
char buff[20]="",tempbuff[2]="";
long tempint=0;
int kread = _KEYBRD_READ;
int kready = _KEYBRD_READY;
int i,count = 1;
unsigned key, ascii = 0;
_settextposition( drow, dcol );
fputs(prompt, stdout);

while( _bios_keybrd( kready ) )
    _bios_keybrd( kread );

while( count <= length)
    {
    do
        {
        key = _bios_keybrd( kread );
        ascii = key & 0x00ff;
        }
```

```
    while ((ascii != 27) && (ascii !=13 )  && !((ascii >= 48) && (ascii <=57)) && (ascii !
=46));
    if (ascii == 27)
       return(0);
    else
       if (ascii == 13)
          {
          strcat(buff,"\0");
          return((float)atof(buff));
          }
       else
          {
          tempbuff[0] = (char)(ascii);
          strcat(buff, tempbuff);
          printf("%c",tempbuff[0]);
          ++count;
          }
    }
   _settextposition( drow+1, dcol );
   _settextposition( 23, 44 );
   printf("Input number is too long.");
   _settextposition( 24, 44 );
   printf("Press any key to continue.....");
   getch();
   return(0);
} float  two_dots_distance(void)
{
   int i,j,dot_num;
   int width = 0;
   int x_begin,x_end;
   float first_dot  = 0.0;
   float second_dot = 0.0;
   int thrs = 125;
   int dots_cnt;
   LUT *lut;                       /* Pointer to the input LUT */
   PIX8 dot1,dot2;
   PIX8 aaa,bbb;
   unsigned char threshold_char = '\x80';
   PIX8 threshold = &threshold_char;
   int g_level;
   float wire_begin,wire_end;
   float x1,yy1,x2,y2,x3,x4,a,b ;
   float avg_distance;
   FILE *ftable;
   char tmpbuf[128],timebuf[5], datebuf[5];
   int add_flag[4];
   long start_time;

image_beg = 20;
   centre_line = 392 /*280*/;
   g_level = 125;

/*************************************************

Set 'acqmode' to manual mode: In this mode, all Acquisition OPRs
and Acquisition functions will not automatically update the OC-x
device. Only a direct call to 'acqsync' or a Frame Operation
will update the OC-x device. Thus several calls to the
Acquisition API can be combined into a single Frame Operation.
Thus by setting the 'acqmode' to manual mode, all calls to the
Acquisition API done inside the 'iw_grab' function will be done
in a single Frame Operation.

*************************************************/ if( (buf = malloc( 512 * 32)) == NULL) return(0.0);

old_acqmode = o_opr_inq( getdevice( stdiw), ACQMODE);
   o_opr_set( getdevice( stdiw), ACQMODE, old_acqmode | 0x04);

setadcoffset( stdiw, data.offsets);     /* set offset */
   setadcrange ( stdiw, data.ranges);      /* set range  */
/*
   lut = lut_alloc( stdiw, LUT_IN);
      lut_thrs( lut,
                0,
                thrs,
                255);
      lut_sel( lut);
```

```
    if( lut == NULL) return;
*/
    init_tick();                                            /* Init timer */
if (calibration)
        {
/*********************
        Box(20,10,4,60);
        _settextposition( 21, 12 );
        sprintf(Txtbuf,"Positions:");
        _outtext( Txtbuf );
        _settextposition( 22, 12 );
        sprintf(Txtbuf,"The length between the two points is :       (Pixels)");
        _outtext( Txtbuf );
        _settextposition( 23, 12 );
        sprintf(Txtbuf,"Grabbing:");
        _outtext( Txtbuf );
        _settextposition( 24, 12 );
        sprintf(Txtbuf,"Distance (inch): Current");
        _outtext( Txtbuf );
        cursor(25,0);                           // Move cursor out of screen
*********************/
        }
else
        {
        Box(22,10,2,60);
        _settextposition( 23, 12 );
        sprintf(Txtbuf,"Thickness:");
        _outtext( Txtbuf );
        cursor(25,0);                           /* Move cursor out of screen */
        }

/***** take out ***/
    if( (ftable = fopen( "dot.dat", "at" )) == NULL )
                {
                puts("Error opening fi2le \"DOT.DAT\"");
                fcloseall();
                exit(-1);
                }
/*****/
start_time = coarse_timer();

while( 1 )
                {
                avg_distance = 0;
                j = 1;
                while( (j <= (calibration? 50:10)))
                        {
                        dot_num = 1;
                        x_begin = FALSE;
                        x_end = FALSE;
                        x1 = 0;
                        x2 = 0;
                        x3 = 0;
                        x4 = 0;
                        if (((coarse_timer() - start_time) > TIMEOUT) && calibration)
                                {
                                fcloseall();
                                free_tick();
                                free(buf);
                                o_opr_set( getdevice( stdiv), ACQMODE, old_acqmode);
                                return(-2);
                                } first_dot = 0;
                        second_dot = 0;
                        for (i=1; i<=4; i++)
                                add_flag[i] = TRUE;
                        time0 = tick();
                        iv_grab( stdiv, 1);
                        time1 = tick();
                        while( getacqsts( stdiv));  /* wait for grab to finish */
                        time2 = tick();

if ((dots_cnt = iv_rline(stdiv,image_beg,centre_line,DIR_E,512,b:
f)) == -1)
                                return(0.0);
                        time3 = tick();
                        iv_wline(stdiv,image_beg,centre_line+50,DIR_E,512,buf);
                        dot2 = buf;
                        dot1 = buf;
/*
    for (i = dots_cnt;i>0;--i)
        {
```

```
            printf("pixel value %x \n ",*dot2);
            ++dot2;
            }
*/
    /* find distance between the two dots in the line */
    time4 = tick();
    /* Since the gray level of each image capture is off in the rage of 10
       use a variable to store the average gray level. The average gray level
       is taking by averaging gray level on two pixels at the beginning of
       the line. by compareing the current gray level and the average gray
       level, the gray level off set can be found.
    */ i = 1;
    while (i <= dots_cnt )
       {
       aaa = dot1;
       ++dot1;
       bbb = dot1;
       /*
       if (i == 1)
          {
          two_sum = *aaa + *bbb;
          change_gl = two_avg - two_sum ;
          if two_avg = (two_avg * 99 + two_sum) / 100
       */
       if (x_begin == FALSE)
           {
           if ((*aaa < *threshold) && (*bbb >= *threshold))
              {
              x_begin = TRUE;
              if (( width < 3) || (x_end == FALSE))
                 {
                 wire_begin = i;
                 if ((*aaa > 50) || (*bbb < 200))
                    {
                    if ((128 - *aaa) < rrr)
                       {
                       wire_begin -= adjustment((float)( rrr -(128 - *aaa)));
                       }
                    if ((*bbb - 128) < rrr)
                       {
                       wire_begin += adjustment((float)( rrr - ( *bbb -128)));
                       }
                    }
/*         if( (ftable = fopen( "dot.dat", "a" )) == NULL ) */
/*                       return;           */
/******** take out ***
           sprintf(Txtbuf, " %u  %u  %6.5f ",(unsigned)*aaa,(unsigned)*bbb, wire_begin );
           if (fputs( Txtbuf, ftable))
                 {
                 leave();
                 }
*****/
                  /* if ((( 128 - *aaa) < 10) || ( (*bbb - 128) < 10))
                     if ( *aaa > (256 - *bbb))
                        {
                        wire_begin -= (float)(*aaa)/256;
                        add_flag[dot_num] = FALSE;
                        }
                     else
                        {
                        wire_begin += (float)(256 - *bbb)/256;
                        add_flag[dot_num] = TRUE;
                        }
                  else
                     {
                     if (dot_num == 1)
                        {
                        if (add_flag[1] == TRUE)
                           wire_begin += (float)(256 - *bbb)/256;
                        else
                           wire_begin -= (float)(*aaa)/256;
                        }
                     else
                        {
                        if (add_flag[2] == TRUE)
```

```
                              wire_begin += adjustment((float)(256 - *bbb)/256;
                     else
                              wire_begin -= adjustment((float)(*aaa)/256;
                    }
               }
             wire_begin += (float)(*aaa + *bbb - q_level)/502;
              if ((g_level = *aaa) > 50)
               {
                wire_begin += (float)(g_level-50)/225;
               }
               if ((g_level = *bbb) < 200)
               {
                wire_begin -= (float)(200 - g_level)/225 ;
               }
             */
              x_end = FALSE;
              }
            }

}
      else
         {
         if ((*aaa >= *threshold) && (*bbb < *threshold))
          {
          x_end = TRUE;
          if (( width < 3) || (x_begin == FALSE))
            {
            x_begin = FALSE;
            width   = 0;
            x_end   = FALSE;
            }
          else
            {
            wire_end = i;
               if ((*bbb > 50) || (*aaa < 200))
                 {
                 if ((128 - *bbb) < rrr)
                   {
                    wire_end += adjustment((float)( rrr -(128 - *bbb)));
                   }
                 if ((*aaa - 128) < rrr)
                   {
                    wire_end -= adjustment((float)( rrr - ( *aaa -128)));
                   }
                 }

/*        if( (ftable = fopen( "dot.dat", "a" )) == NULL ) */
/*                     return;         */
/****** take out ****
         sprintf(Txtbuf, " %u  %u  %6.5f  %6.5f \n",(unsigned)*aaa,(unsigned)*bbb,wire_en
d, wire_end-wire_begin );
         if (fputs( Txtbuf, ftable))
             {
             leave();
             }
*******/
           /* if ( ( *bbb > 50) || ( *aaa < 200 ))
               {
                if ((( 128 - *bbb) < 10) || ( (*aaa - 128) < 10))
                  if ( *bbb > (256 - *aaa))
                    {
             wire_end += (float)(*bbb)/256;
             add_flag[dot_num+2] = TRUE;
             }
           else
             {
             wire_end -= (float)(256 - *aaa)/256;
             add_flag[dot_num+2] = FALSE;
             }
         else
           {
           if (dot_num == 1)
              {
              if (add_flag[3] == TRUE)
                 wire_end += (float)( *bbb)/256;
              else
```

```
                        wire_end -= (float)(256 - *aaa)/256;
                    }
                else
                    {
                    if (add_flag[4] == TRUE)
                        wire_end += (float)( *bbb)/256;
                    else
                        wire_end -= (float)(256 - *aaa)/256;
                    }
                }

}
        wire_end += (float)(*aaa + *bbb - g_level)/502;
        if ((g_level - *aaa) < 200)
           {
           wire_end -= (float)(200 - g_level)/225;
           }
           if ((g_level - *bbb) > 50)
           {
           wire_end += (float)( g_level - 50 )/225 ;
           }
        */
       if (dot_num == 1)
           {
           x1 = wire_begin;
           x2 = wire_end;
           first_dot = (float)(x2 + x1)/2;
           x_begin = FALSE;
           width   = 0;
           dot_num = 2;
           x_begin = FALSE;
           width   = 0;
           x_end   = FALSE;
           }
       else
           {
           x3 = wire_begin;
           x4 = wire_end;
           second_dot = (float)(x4 + x3)/2;
           i = dots_cnt +10;     /* set to condition to end the loop */
           }
           }
       }
   }
if (x_begin) ++width;
   ++i;

}         /* end of loop for the line */
       dots_distance = second_dot - first_dot;
   if (dots_distance > 0)
       avg_distance += dots_distance;
   else
       /* Note when j = 1 there will be an division by zero error */
       if (j != 1)
          avg_distance += (avg_distance/(j-1));
       else
          --j;
       time5 = tick();

++j;
           if (kbhit())
               {
               fcloseall();
               free_tick();
               free(buf);
               o_opr_set( getdevice( stdiv), ACQMODE, old_acqmode);
               if (calibration == TRUE)
                   {
                   return(-1);
                   }
               return(0.0);
               }
   }   /* End of reading 50 lines */
   if (calibration)
       {
       fcloseall();
       free_tick();
       free(buf);
       o_opr_set( getdevice( stdiv), ACQMODE, old_acqmode);
       return (avg_distance/50);
       }
   else
       {
```

```c
/*      Apply the hyperbolic relationship to calculate the average size */
        sprintf(Txtbuf,"%3.4f   ",
             data.C3 + data.C2 / ((avg_distance / 10) - data.C1));
        putf(22, 30, WHITEBACK | BLACK, Txtbuf);
        }

/*****
    tzset();
    _strtime( tmpbuf );
        memcpy(timebuf,tmpbuf,5);
        sprintf( Txtbuf, "%s %6.5f \n",timebuf,data.slope * (avg_distance/50) - data.con
stant );
        if (fputs(Txtbuf, ftable)) leave();
*****/
    }
} float adjustment(float x)
    {
    float y;
    y = 0.012 * x -.1 ;
    if (y<0)
        y=0;
    return(y);
    } void  leave(void)
{
        fcloseall();
        clrscr();
        puts("Error in fputs function (Disk probably full)");

exit(-1);
} void  Calibrate(void)
{
float   size2, size3, pix1, pix2, pix3;
char str[20];

Box(18, 11, 6, 62);
        putf(18, 30, WHITEBACK | BLACK, "CALIBRATION");

putf(20, 11, WHITEBACK | BLACK,
              "Remove any parts from the measuring area of and press <Enter>");
        cursor(25,0);
        getch();
        putf(21, 13, REDBACK | WHITE | BLINK,
              "*** DO NOT DISTURB THE GAUGE WHILE CALIBRATING ***");

calibration = TRUE;
        pix1 = two_dots_distance();
        if ((pix1 == -1) || (pix1 == -2))
             return;
        putf(21, 13, WHITEBACK | BLACK,
                                                                       ");

putf(20, 11, WHITEBACK | BLACK,
              " Place gauge 1 in Hypergauge and enter its size:"         ");
        size2 = GetNumericEntry(20, 61, 9, BLUEBACK | WHITE | BRIGHT);
        if (size2 == -1)
             return;
        putf(21, 13, REDBACK | WHITE | BLINK,
              "*** DO NOT DISTURB THE GAUGE WHILE CALIBRATING ***");
        calibration = TRUE;
        pix2 = two_dots_distance();
        putf(21, 13, WHITEBACK | BLACK,
                                                                       ");
        if ((pix2 == -1) || (pix2 == -2))
             return;
        putf(22, 13, WHITEBACK | BLACK,
              "Place gauge 2 in Hypergauge and enter its size:");
        size3 = GetNumericEntry(22, 61, 9, BLUEBACK | WHITE | BRIGHT);
        if ((size3 == -1) || (size2 == -2))
             return;
        putf(21, 18, REDBACK | BLACK | BLINK,
              "*** DO NOT DISTURB THE GAUGE WHILE CALIBRATING ***");
        calibration = TRUE;
        pix3 = two_dots_distance();
/*
 *      Calculate the constants of the hyperbolic function that relates
 *      the number of pixels with the thickness of the part being measured
 *      This function is:
 *              T = C1 + C2 / (P - C3)
```

```
where T is the thickness, P is the number of pixels and C1, C2 and C3
are constants. (note: size0 is zero)
*/ data.C3 = ((pix1 - pix2) * size3 * size2 - size2 * (pix1 - pix3) * size3) /
              ((pix1 - pix2) * size3 - size2 * (pix1 - pix3));

data.C2 = (pix1 - pix2) * data.C3 * (data.C3 - size2) / size2;

data.C1 = pix1 + data.C2 / data.C3;

writestatus();

}
```

We claim:

1. An apparatus for determining the position of a specimen relative to a reference point comprising;
   (a) source means for producing a beam of electromagnetic radiation;
   (b) splitting means for splitting said beam into a primary beam and a secondary beam;
   (c) reflecting means for directing said primary and secondary beams onto a surface of said specimen when in a measuring position between the source means and the reference point such that each of said primary and said secondary beams impinge said surface at an angle and converge at said reference point;
   (d) means for sensing the points at which said primary and said secondary beams impinge said surface of said specimen and for producing a signal related thereto; and
   (e) means for processing said signal to determine the position of said surface of said specimen relative to said reference point.

2. An apparatus as claimed in claim 1, wherein said reflecting means comprises two reflectors, one of said reflectors directing said primary beam onto a surface of said specimen and the other of said reflectors directing said secondary beam onto said surface, such that said primary and secondary beam impinge onto said surface, such that said primary and secondary beams are inclined in opposite directions with respect to said surface.

3. An apparatus as claimed in claim 2, wherein the source means, the splitting means and the reflecting means are aligned with one another.

4. An apparatus as claimed in claim 2, wherein each of the two reflectors is pivotally mounted around a pivot axis that extends through a plane of the reflector and which is generally perpendicular to a plane containing the primary and secondary beams.

5. An apparatus as claimed in claim 4, wherein said means for sensing comprises a photosensor array and a lens system for focusing said points onto said photosensor array.

6. An apparatus as claimed in claim 5, wherein said photosensor array comprises a CCD line scan camera.

7. An apparatus as claimed in claim 5, which includes electric motor means for the reflecting means, for pivotally adjustment thereof about their respective pivot axes, and for the lens system for adjustment thereof.

8. An apparatus as claimed in claim 7, wherein the electric motors are connected to the processing means, for automatic adjustment thereof.

9. An apparatus as claimed in claim 5 which includes single electric motor driving a common shaft, and gear means connecting the shaft to each of the reflectors, the processor being connected to and controlling the electric motor.

10. An apparatus as claimed in claim 1, 3 or 7, further including means for calibrating the apparatus, the means for calibrating having a plurality of reference surfaces and a movement mechanism upon which the reference surfaces are mounted, the movement mechanism being capable of sequentially moving the reference surfaces into measuring position with the location of each reference surface in the measuring position being known, whereby the apparatus can be calibrated by the reference surfaces.

11. An apparatus as claimed in claim 10, wherein the reference surfaces are secured to a common shaft which moves the reference surfaces by rotation thereof.

12. A system comprising a first apparatus and a second apparatus as claimed in claim 1, 3 or 7, with the first apparatus arranged to determine the position of one surface of a specimen, relative to a first respective reference point, and the second apparatus arranged to determine the position of another and opposite surface of the specimen relative to a second respective reference point, and the means for processing being coupled to the first and second apparatus and including means for computing the thickness of the specimen from the positions determined by the first and second apparatus respectively.

13. A system comprising at least three apparatus as claimed in claim 1, 3 or 7, wherein each of the three apparatus are arranged to determine a position for a separate portion of one surface of a specimen and including processor means for determining the flatness of the specimen from the positions determined by the three apparatus.

14. A system as claimed in claim 13, wherein the three apparatus are spaced both longitudinally and horizontally from one another.

15. An apparatus for determining the position of a planar surface or specimen relative to a reference point, the apparatus comprising;
   source means for producing a pair of beams included at opposite directions to the planar surface of the specimen;
   means for sensing the points at which said beams impinge said surface of said specimen and for producing a signal related thereto;
   means for processing said signal to determine the position of said surface of said specimen relative to said reference point;
   calibration means comprising a plurality of reference surfaces; and
   a movement mechanism to which the reference surfaces are mount, which movement mechanism is capable of moving each reference surface sequentially to a measuring position, with the location of each reference surface in the measurement position relative to the reference point being known, whereby to permit calibration of the apparatus.

16. An apparatus as claimed in claim 15, wherein the movement mechanism comprises a shaft to which the reference surfaces are secured, and which moves the reference surfaces by rotation thereof.

17. An apparatus as claimed in claim 15 or 16, which includes a second sources means for determining the position of a second planar surface of the specimen, opposite and parallel to the first-mentioned planar surface, which includes a plurality of reference elements, each of which includes upper and lower reference surfaces for enabling each apparatus to be calibrated thereby.

* * * * *